(12) United States Patent
Sekharan

(10) Patent No.: US 9,715,556 B2
(45) Date of Patent: Jul. 25, 2017

(54) TECHNIQUES FOR CREATING DYNAMIC INTERACTIVE INFOGRAPHICS

(71) Applicant: Satishkumar Sekharan, Vancouver (CA)

(72) Inventor: Satishkumar Sekharan, Vancouver (CA)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 775 days.

(21) Appl. No.: 14/075,612

(22) Filed: Nov. 8, 2013

(65) Prior Publication Data

US 2015/0135056 A1    May 14, 2015

(51) Int. Cl.
   G06F 17/22    (2006.01)
   G06F 17/30    (2006.01)

(52) U.S. Cl.
   CPC .............................. *G06F 17/30893* (2013.01)

(58) Field of Classification Search
   CPC .................................................. G06F 17/2247
   USPC ........................................................ 715/234
   See application file for complete search history.

(56) References Cited

U.S. PATENT DOCUMENTS

| | | | | |
|---|---|---|---|---|
| 5,990,888 | A * | 11/1999 | Blades | G06T 11/206 715/764 |
| 6,906,717 | B2 * | 6/2005 | Couckuyt | G06T 11/206 345/440 |
| 2004/0181543 | A1 * | 9/2004 | Wu | G06F 17/30572 |
| 2008/0192056 | A1 * | 8/2008 | Robertson | G06T 13/80 345/440 |
| 2009/0157630 | A1 * | 6/2009 | Yuan | G06F 17/30864 |
| 2009/0254557 | A1 * | 10/2009 | Jordan | G06F 17/30994 |
| 2009/0287814 | A1 * | 11/2009 | Robertson | G06F 17/30994 709/224 |
| 2010/0235771 | A1 * | 9/2010 | Gregg, III | G06T 11/206 715/769 |
| 2010/0313155 | A1 * | 12/2010 | Willekes | G06F 17/24 715/769 |
| 2011/0181597 | A1 * | 7/2011 | Cardno | G06Q 40/04 345/440 |
| 2012/0005045 | A1 * | 1/2012 | Baker | G06Q 30/0643 705/27.2 |
| 2013/0185624 | A1 * | 7/2013 | Appleyard | G06Q 10/10 715/234 |
| 2013/0187926 | A1 * | 7/2013 | Silverstein | G06Q 10/105 345/440 |
| 2013/0275904 | A1 * | 10/2013 | Bhaskaran | G06F 3/048 715/771 |

(Continued)

*Primary Examiner* — Frank D Mills
(74) *Attorney, Agent, or Firm* — Fountainhead Law Group P.C.

(57) ABSTRACT

A computer implemented system comprises one or more computer processors and a non-transitory computer-readable storage medium. The non-transitory computer-readable storage medium comprises instructions, that when executed, control the one or more computer processors to be configured for receiving a first input representative of associating the text object and the graphical representation, determining a relationship between the text object and the graphical representation, converting the text object to a control variable according to the relationship, and linking the control variable to the graphical representation, wherein the graphical representation is dynamically updated when a second input is received that modifies the control variable.

20 Claims, 23 Drawing Sheets

(56) References Cited

U.S. PATENT DOCUMENTS

| | | | |
|---|---|---|---|
| 2014/0164073 A1* | 6/2014 | Mosley | G06Q 10/06398 705/7.42 |
| 2015/0074127 A1* | 3/2015 | Cherwinka | G06F 17/30994 707/755 |
| 2015/0077419 A1* | 3/2015 | Abuelsaad | G06F 17/27 345/440 |

* cited by examiner

| Rank | Province or Territory | Population | % from Canadian average | Rank (violent crime) | Rank (non-violent crime) | % change since 2005* | % change since 2000* |
|---|---|---|---|---|---|---|---|
| 1 | | 38,220 | 31.8 | 1 | 2 | 5.7 | 38.1 |
| 2 | Northwest Territories | 43,759 | 311.3 | 2 | 1 | -0.9 | 35.1 |
| 3 | | 34,525 | 107 | 3 | 3 | -14.1 | -38.1 |
| 4 | | 1,045,622 | 79.1 | 5 | 4 | -18.3 | -12.6 |
| 5 | | 1,235,412 | 59.5 | 4 | 5 | -18.5 | -14.6 |
| 6 | | 4,580,960 | 23.8 | 6 | 6 | -30 | -29.2 |
| 7 | | 3,720,946 | 18.4 | 7 | 7 | -19.7 | -32 |
| 8 | Nova Scotia | 942,506 | 1 | 8 | 9 | -18.2 | -12.4 |
| 9 | | 508,739 | -3 | 11 | 8 | 2.1 | 14.4 |
| 10 | Quebec | 7,907,375 | -7.1 | 10 | 10 | -14.5 | -24.5 |
| 11 | | 731,755 | -16.6 | 12 | 12 | -13.3 | -18.7 |
| 12 | Prince Edward Island | 142,266 | -20.3 | 13 | 11 | -14.2 | -13.6 |
| 13 | | 13,210,667 | -21.4 | 9 | 13 | -15.5 | -27 |

Provinces and Territories

Crime severity index

FIG. 2b

| City | Providence | Population | Average_Percentage |
|---|---|---|---|
| Surrey | BC | 444583 | 58.2 |
| New Westminster | BC | 66311 | 43.4 |
| | BC | 660,496 | 33.5 |
| | BC | 105,708 | 30.5 |
| Maple Ridge | BC | 77202 | 24.5 |
| Burnaby | BC | 230009 | 20.7 |
| North Vancouver | BC | 51175 | ~~~~~ |
| Richmond | BC | 196856 | -10.9 |
| Port Coquitlam | BC | 59039 | -11.8 |
| Coquitlam | BC | 128747 | |
| Delta | BC | 109322 | -18.7 |
| West Vancouver | BC | 50269 | -38.3 |

FIG. 3a

TECHNIQUES FOR CREATING DYNAMIC INTERACTIVE INFOGRAPHICS

BACKGROUND

The World Wide Web contains information that is accessible through billions of web pages. Some of that information can be collected and presented as an infographic. An infographic is a graphical visual representation of information. The infographic can be presented to a viewer to support a position on a particular topic of interest. Benefits of presenting the information as an infographic is so that the information can be consumed more quickly and clearly by the viewer.

However, the process for generating an infographic can be both cumbersome and time consuming. With the plethora of information available on the Internet, it has become time-consuming to locate relevant information. Once relevant information that is found, the information needs to be processed before it can be used. Relevant information that is manually entered is also prone to user error. This issue can be exasperated when the position supported by the infographic changes and therefore the infographic needs to be reconstructed to support the new position.

SUMMARY

In one embodiment, a computer-implemented method provides, by a processor, a graphical user interface of an infographic template that includes a first area presenting a text object and a second area presenting a graphical representation of a first property from a table. The method then receives, by the processor, a first input representative of associating the text object and the graphical representation. The method then continues with determining, by the processor, a relationship between the text object and the graphical representation. Upon determining the relationship, the method then converts, by the processor, the text object to a control variable according to the relationship. Finally, the method links, by the processor, the control variable to the graphical representation, wherein the graphical representation is dynamically updated when a second input is received that modifies the control variable.

In another embodiment, a non-transitory computer readable storage medium stores one or more programs comprising instructions for providing a graphical user interface of an infographic template that includes a first area presenting a text object and a second area presenting a graphical representation of a first property from a table. The one or more programs further include instructions for receiving a first input representative of associating the text object and the graphical representation. The one or more programs further include instructions for determining a relationship between the text object and the graphical representation. The one or more programs further include instructions for converting the text object to a control variable according to the relationship. The one or more programs further include instructions linking the control variable to the graphical representation, wherein the graphical representation is dynamically updated when a second input is received that modifies the control variable.

In another embodiment, a computer implemented system comprises one or more computer processors and a non-transitory computer-readable storage medium. The non-transitory computer-readable storage medium comprises instructions, that when executed, control the one or more computer processors to be configured for receiving a first input representative of associating the text object and the graphical representation, determining a relationship between the text object and the graphical representation, converting the text object to a control variable according to the relationship, and linking the control variable to the graphical representation, wherein the graphical representation is dynamically updated when a second input is received that modifies the control variable.

The following detailed description and accompanying drawings provide a better understanding of the nature and advantages of the present disclosure.

BRIEF DESCRIPTION OF THE DRAWINGS

FIG. 2b illustrates a web browser running an applet on a web page according to one embodiment;

FIG. 3a illustrates a screenshot of an application running on the client according to one embodiment;

DETAILED DESCRIPTION

In the following description, for purposes of explanation, numerous examples and specific details are set forth in order to provide a thorough understanding of the present disclosure. The first portion of the description will describe techniques for collecting information from the Internet to form intelligent datasets. The second portion of the description will describe techniques to generate interactive infographics that utilize the intelligent datasets. An interactive infographic is an artifact that can be rendered by a web browser as a presentation. It will be evident, however, to one skilled in the art that the present disclosure as expressed in the claims may include some or all of the features in these examples alone or in combination with other features described below, and may further include modifications and equivalents of the features and concepts described herein.

Building Intelligent Datasets

Figure 1:
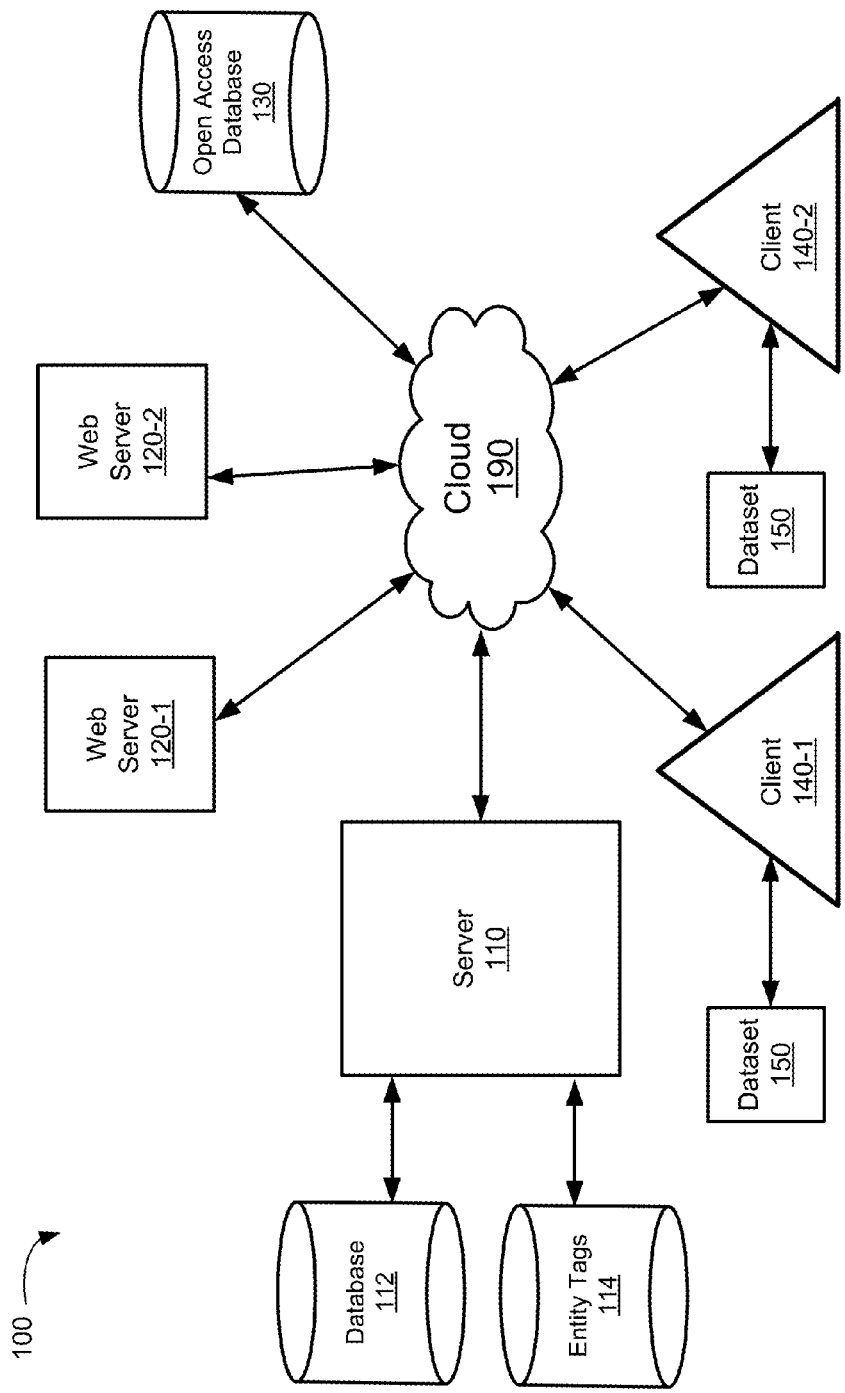
FIG. 1 illustrates a system according to one embodiment.

FIG. 1 illustrates a system according to one embodiment. System 100 includes server 110, web server 120-1, web server 120-2, open access database 130, client 140-1, and client 140-2. Each of these devices can be connected to one another through cloud 190. Client 140-1 can communicate with server 110, web servers 120, and open databases 130 to create dataset 150. A dataset is a collection of data that is related to a topic, object, or event. For example, a dataset can include data related to the quality of schools in a given area or data related to the severity of crime in a given area. In some examples, the dataset can be a table.

Client 140-1 can collect data for dataset 150 from a variety of sources. The data can be collected and processed by an application running on client 140-1. In one embodiment, client 140-1 can collect data for dataset 150 from web server 120-1. This can include client 140-1 scraping or selectively copying data from a web page received from web server 120-1. Once collected, web server 120-1 can populate dataset 150 using the collected data. In another embodiment, client 140-1 can collect data from database 112 of server 110. This can include transmitting a request to server 110 for data from database 112 and receiving the requested data from server 110. In some examples, the data scraped/copied/collected from web server 120 or server 110 can be plain text. Plain text is characters and numbers without metadata. As a result, plain text does not contain context. For instance, the word "apple" as plain text can mean either the fruit or the technology company. It is not until context is provided that the intended meaning can be determined.

In one embodiment, server 110 can be configured to verify dataset 150. Server 110 can receive dataset 150 from client 140-1 and validate the content in dataset 150. Content validation can include verifying that a table in dataset 150 is properly generated without entries that are missing or entries that contain illegal values. Once dataset 150 has been validated, server 110 can transmit dataset 150 back to client 140-1. The transmission of dataset 150 to server 110 can be managed by an application running on client 140-1. In yet other embodiments, the content validation algorithms can be stored on client 140-1, thus allowing content validation to be performed by client 140-1.

In another embodiment, server 110 can be configured to maintain a master copy of dataset 150 on database 112. When changes are made to dataset 150 by client 140-1, the changes can be transmitted from client 140-1 to server 110. Server 110 in turn updates the master copy of dataset 150 stored in database 112 accordingly. By maintaining a master copy of dataset 150 in database 112, multiple clients can work on dataset 150 simultaneously. Each client can work on a copy of dataset 150 and any changes made to dataset 150 can be collected by server 110 to update a master copy of dataset 150. Whenever the master copy is updated, the changes are propagated down to the clients. For example, client 140-2 can work on a copy of dataset 150 while client 140-1 can work on another copy of dataset 150. Client 140-2 can change dataset 150 by using data collected from web server 120-2. At some point in time, changes to dataset 150 made by both clients 140-1 and 140-2 can be transmitted to server 110 where the changes are used to update the master copy of dataset 150. Server 110 can also resolve any conflicts that are related to two clients who change the same entry of dataset 150. This is known as conflict resolution. Once server 110 has updated the master copy of dataset 150, the master copy or changes to the master copy can be propagated to client 140-1 and 140-2 so that they both are working off of the same master copy of dataset 150. In one example, different copies of dataset 150 can be managed using version control such as a version number for dataset 150. In one embodiment, server 110 can verify dataset 150 as it updates dataset 150.

In another embodiment, server 110 can be configured to enrich dataset 150. Data enrichment can include providing context to data stored in dataset 150. For example, dataset 150 can include the word "Apple" in an entry. The word "Apple" can have many meanings, including the fruit and the technology company. Without context, it is difficult to determine the meaning of the entry. Server 110 can enrich dataset 150 by assigning one or more entity tags to an entry, column, or row of dataset 150. Assigning an entity tag can include linking the entity tag or even replacing the plain text in an entry with the entity tag. The entity tag can provide context to data stored in entry, column, or row. In one example, server 110 can analyze dataset 150 before assigning an entity tag. For instance, server 110 can analyze neighboring columns or entries in a column before assigning an entity tag to the column. The entity tags can be arranged as entity collections in entity tags database 114. Server 110 can enrich dataset 150 by comparing and matching entries in dataset 150 with entity tags in an entity collection of entity tags database 114.

In some embodiments, the context provided by an entity tag can allow client 140 or server 110 to further enrich dataset 150 with information from database 112 or open access database 130. Open access database 130 is a reference site containing a collection of references that are publicly accessible. Each reference can be an article, a paper, a table, a chart, a figure, or other information. In some examples, each reference can be associated with one or more entity tags that are used to classify the reference. In some examples, references in open access database 130 can be grouped or linked together according to their entity tags. In other examples, open access database 130 can be a community-built database containing references that are generated by members of the community.

Data in database 112 or open access database 130 that is associated with an entity tag can be used to enrich data in database 150 that has the same entity tag. For example, open access database 130 can have a first article on the fruit "apple" and a second article on the technology company "Apple®." The first article can be associated with a fruit entity tag while the second article can be associated with a technology entity tag. Client 140-1 or server 110 can analyze dataset 150 and determine that a column having a fruit entity tag includes an entry containing the word "apple." In response to the word and the entity tag, column 140-1 or server 110 can enrich the entry by associating the entry with the first article from open access database 130. Server 110 can access entity tags 114 to determine the entity tags that are known and to determine the reference objects or database objects in database 112 or open access database 130 that are associated with a given entity tag. In other examples, the data in database 112 or open access database 130 can be imported into dataset 130 as part of dataset enrichment.

Figure 2A:
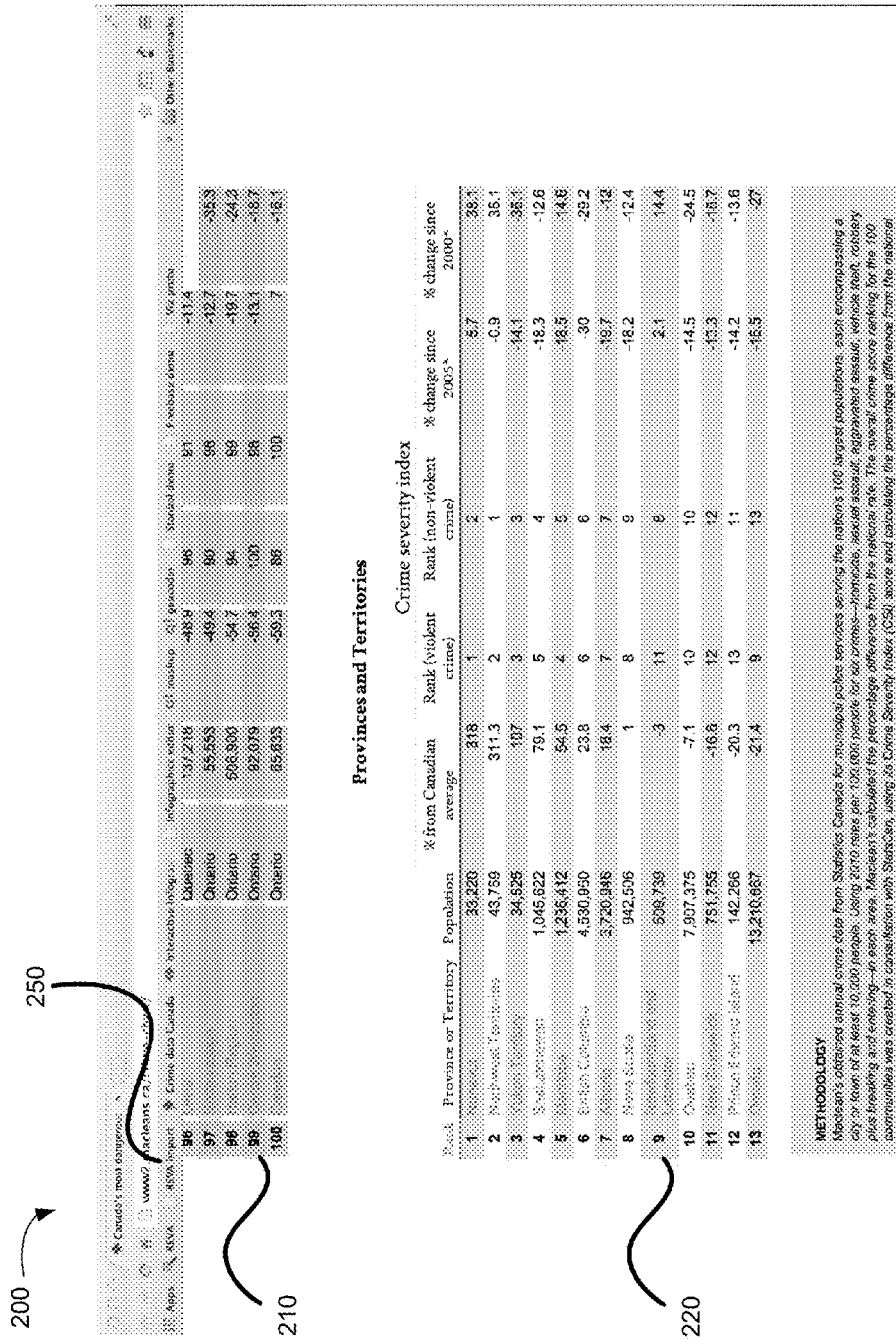
FIG. 2a illustrates a web browser presenting a web page according to one embodiment.

FIG. 2a illustrates a web browser presenting a web page according to one embodiment. Client 140 includes a web browser application that receives data from web server 120 to generate web page 200. Web page 200 includes table 210, table 220, and bookmark link 250. Bookmark link 250 can be configured to trigger an applet of the web browser. When bookmark link 250 is selected, the applet can be executed to collect data from web page 200. The collected data can be imported into an application running on client 140. The application can process the imported data and use the data for creation for an infographic. In some embodiments, the data collected can include data presented on web page 200 and other metadata such as the address of the web page, the address of images collected, the time that the data was collected, the name of documents collected, etc. The metadata can be later utilized by the application to provide context to the data collected. In some embodiments, the applet can be provided from server 110 and installed in the web browser as a plug in.

FIG. 2b illustrates a web browser running an applet on a web page according to one embodiment. The applet is configured to search web page 200 for objects of a predefined type. The predefined type can be tables, graphs, charts, images, embedded documents, pdfs, a combination of these, or others. In some embodiments, the applet is also configured to generate a selectable link on web page 200 for each object that is found. When the applet detects that a selectable link has been selected, the applet can collect the respective object from web server 120. The collected object can be used to generate the dataset. Here, the applet searches web page 200 for tables. A search for tables can be performed by using a standard query for all tables within the web page. The search returns tables 210 and 220. As a result, the applet generates selectable link 215 that is associated with table 210 and selectable link 225 that is associated with table 220. In one example, the applet can modify the HTML code received from web server 120 to include selectable links 215 and 225 before rendering the HTML code as web page 200. In another example, the applet can generate a HTML canvas over web page 200 where the HTML canvas includes selectable links 215 and 225. The HTML canvas can overlay web page 200 and therefore be presented at the same time as web page 200.

Figure 2C:
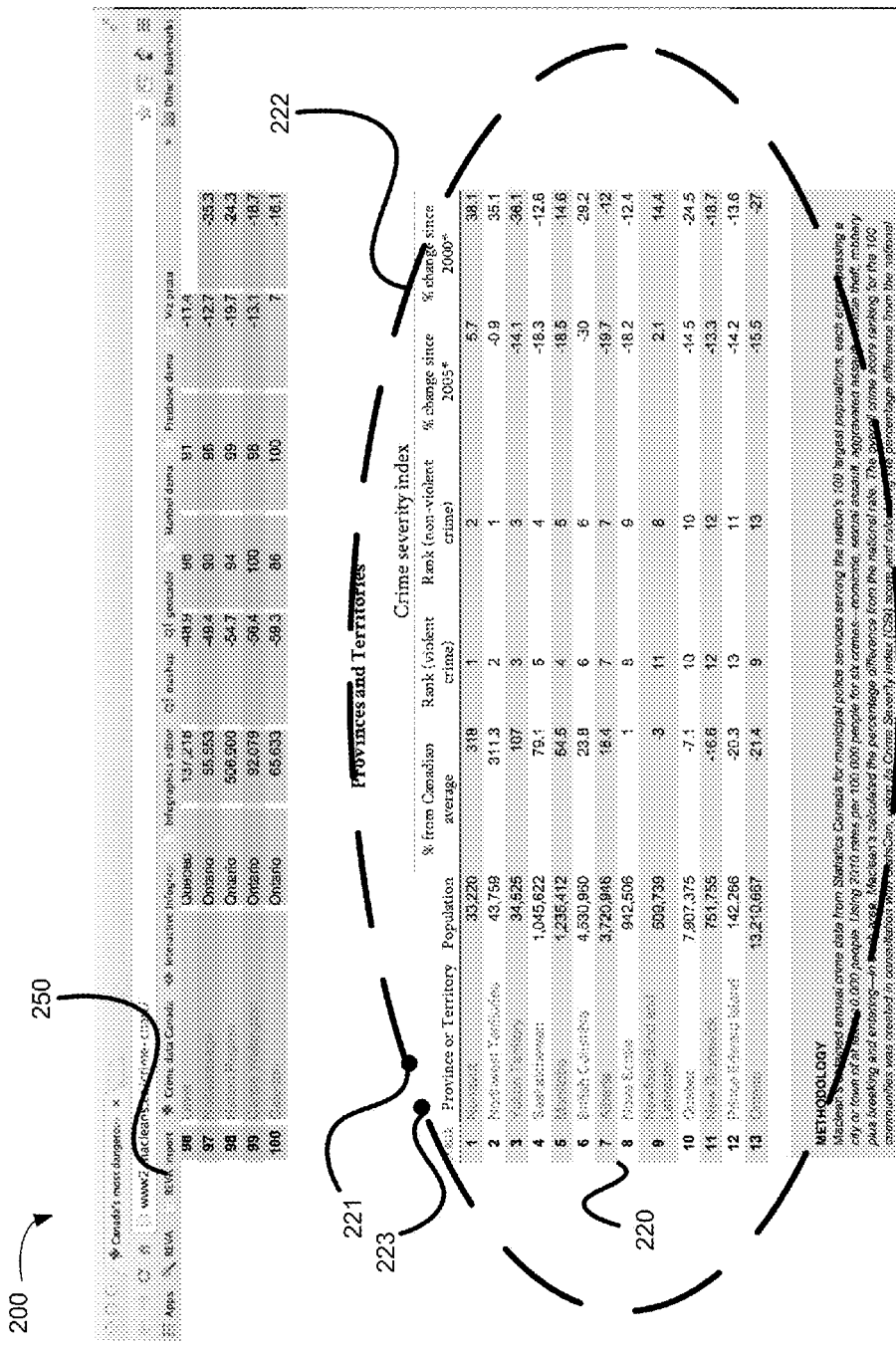
FIG. 2c illustrates a web browser running an applet on a web page according to another embodiment.

FIG. 2c illustrates a web browser running an applet on a web page according to another embodiment. Here, the applet can take a more user-centric approach to collecting data by allowing a user to draw a line around one or more objects in the web page that the user would like to include in a dataset. In one embodiment, the applet can generate an HTML canvas on top of web page 200. The HTML canvas is a clear layer that allows for dynamic rendering of shapes. The rendered shapes exist on the HTML canvas and can overlay web page 200. The rendering of shapes can be based on a variety of user input, including mouse, touchpad, and a touch sensitive display.

Here, the applet can detect a touch gesture on a touch display presenting web page 200 of a finger touching point 221 and drawing line 222. At point 223, the applet can detect the finger being lifted from the touch display. These touch gestures can be interpreted by the applet to draw line 222 on the HTML canvas. The line drawn allows a user to visualize the shape that has been drawn using the touch gestures. If the start point and end point of the line drawn connects, the applet forms a shape based on the line drawn. In some examples, the applet can still form a shape even when the start point and the end point touch do not touch each other so long as the applet detects that the start point and end point are substantially close to one another. Once the shape has been drawn, the applet can query web page 200 for objects that are within or substantially within the shape. The query can examine the shape against the location of objects in web page 200 to identify objects that are within or substantially within the shape. For objects that are partially within the shape, a determination can be made as to whether the majority of the object is within the shape. Here, table 220 is located within the shape created by line 222 drawn on HTML canvas. As a result, the applet collects table 220 for later use.

In yet another embodiment, the applet can detect two points that are simultaneously touching a touch sensitive display. The two points can be detected as the boundaries of a quadrilateral. In one example, the first point can be interpreted as the top left corner and the second point can be interpreted as the bottom right corner. In another example, the first point can be interpreted as the bottom left corner and the second point can be interpreted as the top right corner. Upon detecting the boundaries of the quadrilateral, the applet can search web page 200 for objects that are located within the quadrilateral.

In some embodiments, the applet can perform different actions depending on the type of object that is located. For example, images can be saved in a cache such as a shelf for easy incorporation into an infographic. As another example, images containing text can be processed by an optical character recognition program. As another example, tables can be imported by creating a table and migrating the values from the table to the newly created table. In yet other embodiments, the applet can perform different actions depending on the state of another application running on client 140. For example FIGS. 3a to 3d illustrate techniques for verifying collected data. Data collected may need to be verified to correct for errors generated during the collection process. For example, text and numbers in tables may have been improperly recognized by a text recognition program when the data is collected. As another example, tables having an uncommon structure may not be properly preserved. Uncommon structures can be a table that includes a column having two entries in a first row and only one entry in a second row. These irregular table structures can be improperly scanned, resulting in the values of the dataset not lining up properly in the collected table.

FIG. 3a illustrates a screenshot of an application running on the client according to one embodiment. Screenshot 300 includes an application graphical user interface (GUI) that is displaying dataset 150. Dataset 150 is displayed as table 320 and the values within table 320 have been verified by the application with the results of the verification process being presented in status bar 310. Status bar 310 is presented above the columns of table 320 to identify the status of each column. In one embodiment, the status of each column can be visually represented with the use of flags. If no flags are present in the portion of status bar 310 above a column, then that column has passed verification. Alternatively if a flag is present in the portion of status bar above the column, then that column has verification issues. Depending on the issue, a different flag can be presented. Here, flag 311 is one type of flag for identifying missing entries while flags 312 and 313 are another type of flag for identifying improper values in entries.

Figure 3B:
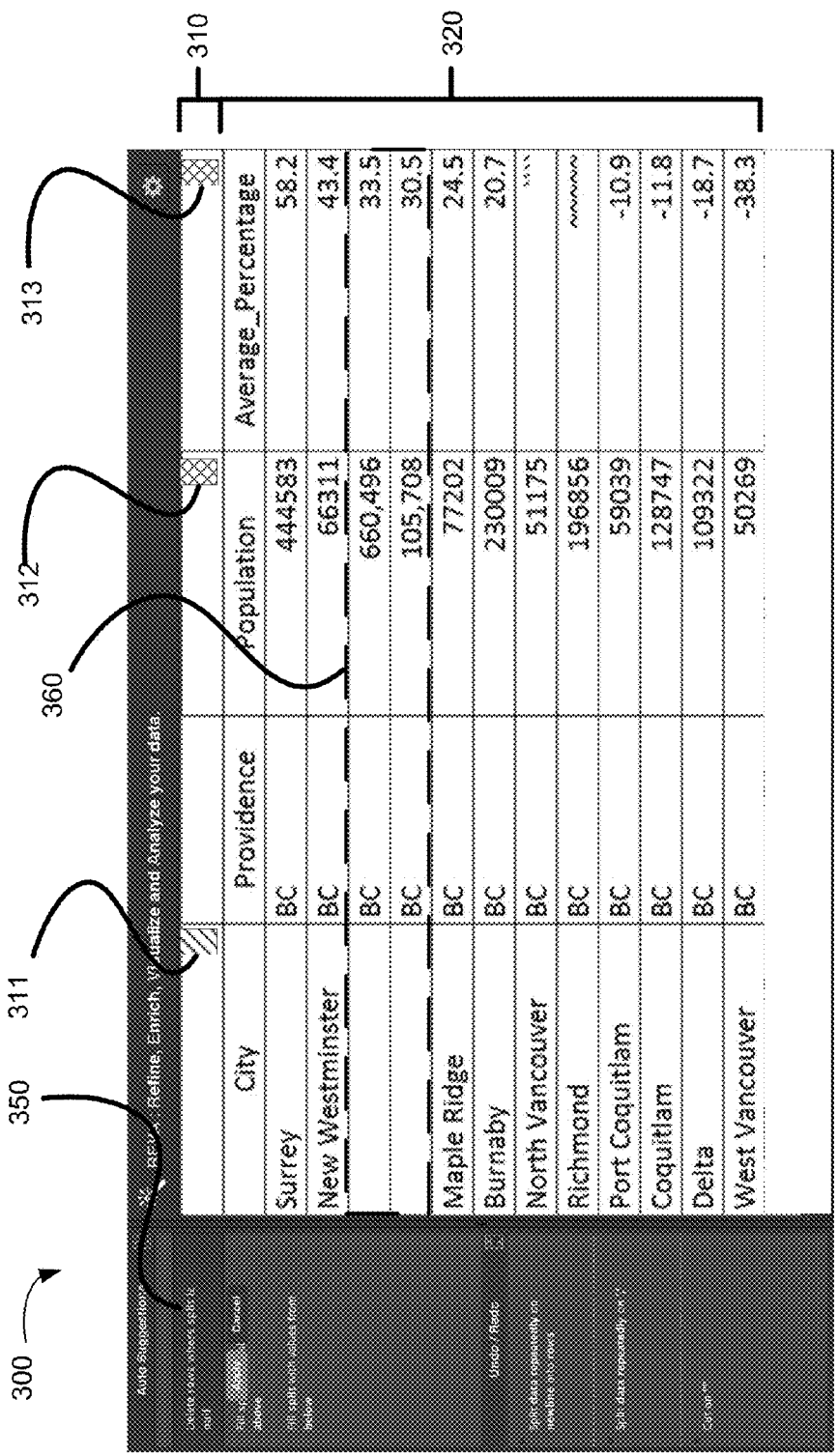
FIG. 3b illustrates a screenshot of an application running on the client according to one embodiment.

FIG. 3b illustrates a screenshot of an application running on the client according to one embodiment. Screenshot 300 is a continuation from FIG. 3a. Above table 320 is status bar 310 that summaries problems identified during the verification process. In one embodiment, selecting a flag in status bar 310 can trigger an action to correct the problem with the associated column of table 320. Here, the application draws box 360 around the rows of table 320 with the problem of an entry missing a value. The application also provides suggestions 350 for actions that can be performed to correct the problem. A user can select one of the suggestions provided and the problem can be corrected accordingly. The suggestions presented can be ordered according to the suggestions that most likely will resolve the problem. In one example, a suggestion for a missing entry can be to delete the row in which that empty entry is located. In another example, a suggestion for a missing entry can be to fill in the missing entry with the value from a neighboring entry in the same column. Here, the user selects an action to delete the rows that contain an empty entry in the selected column.

Figure 3C:
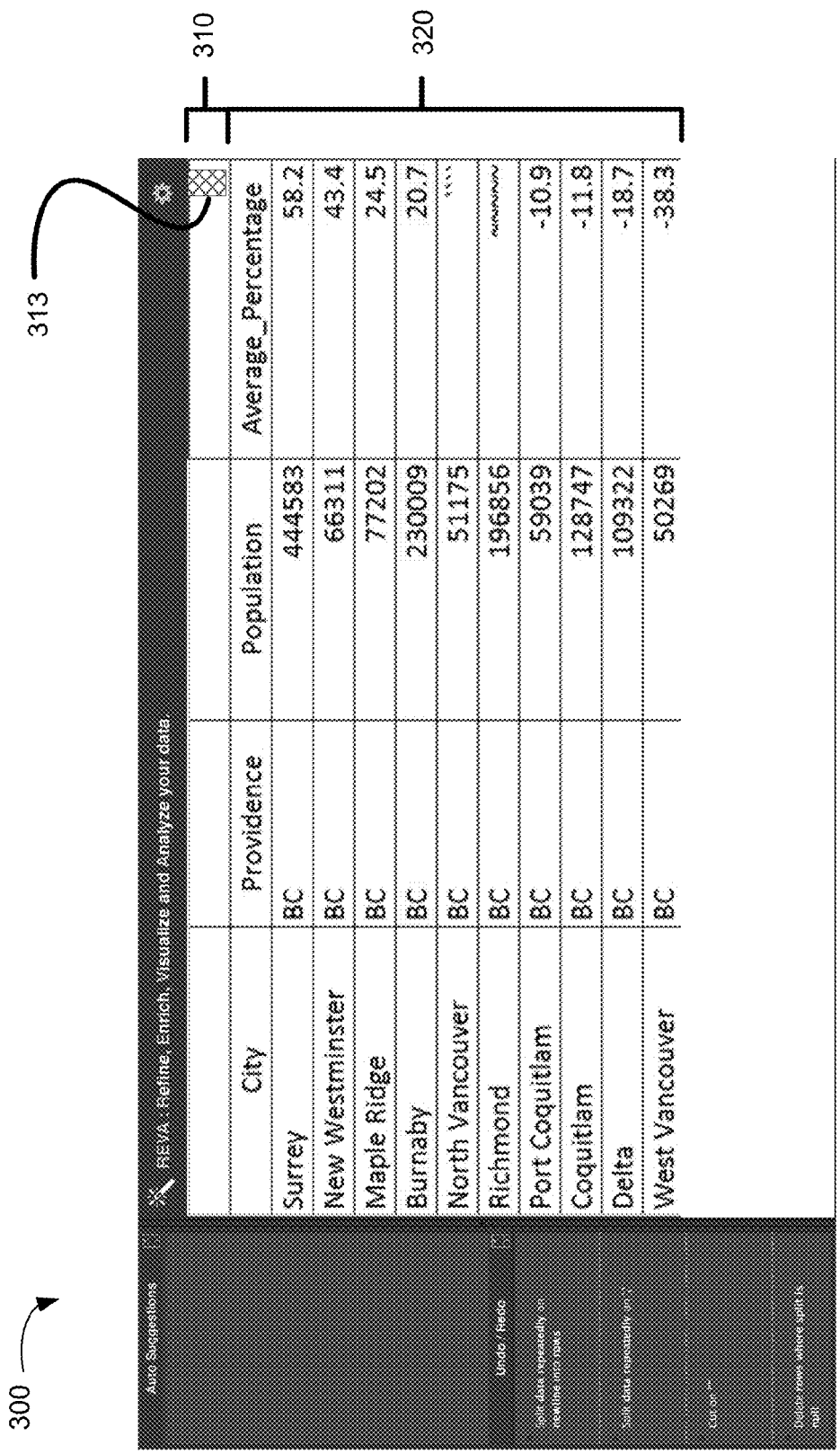
FIG. 3c illustrates a screenshot of an application running on the client according to one embodiment.

FIG. 3c illustrates a screenshot of an application running on the client according to one embodiment. Screenshot 300 is a continuation from FIG. 3b. After removing the rows of table 320 that contain an empty entry, verification is preformed again on table 320. By removing the two rows, the problem associated with flag 312 of FIG. 3b has also been corrected since the issue was with the same rows of entries. Thus, the only remaining problem is with the column associated with flag 313.

Figure 3D:
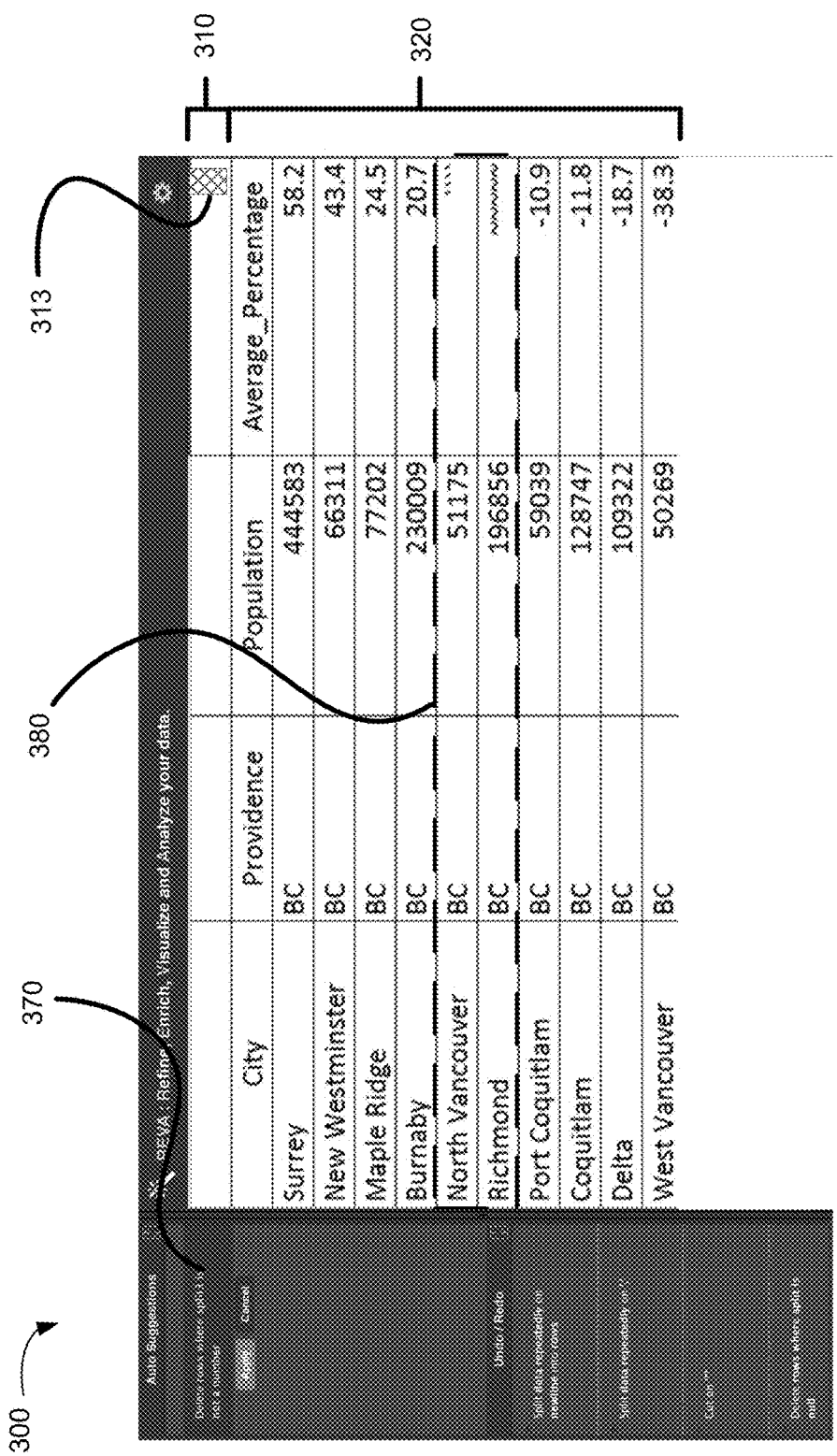
FIG. 3d illustrates a screenshot of an application running on the client according to one embodiment.

FIG. 3d illustrates a screenshot of an application running on the client according to one embodiment. Screenshot 300 is a continuation from FIG. 3c when flag 313 is selected. Upon selection of flag 313, the application can draw box 380 around the rows of table 320 that contain improper values in the selected column. Here, both rows contain an entry that is improper for the column "Average_Percentage" because the entry does not contain a number. Suggestions 370 can also be provided as actions that can be performed to correct the problem.

Figure 4A:
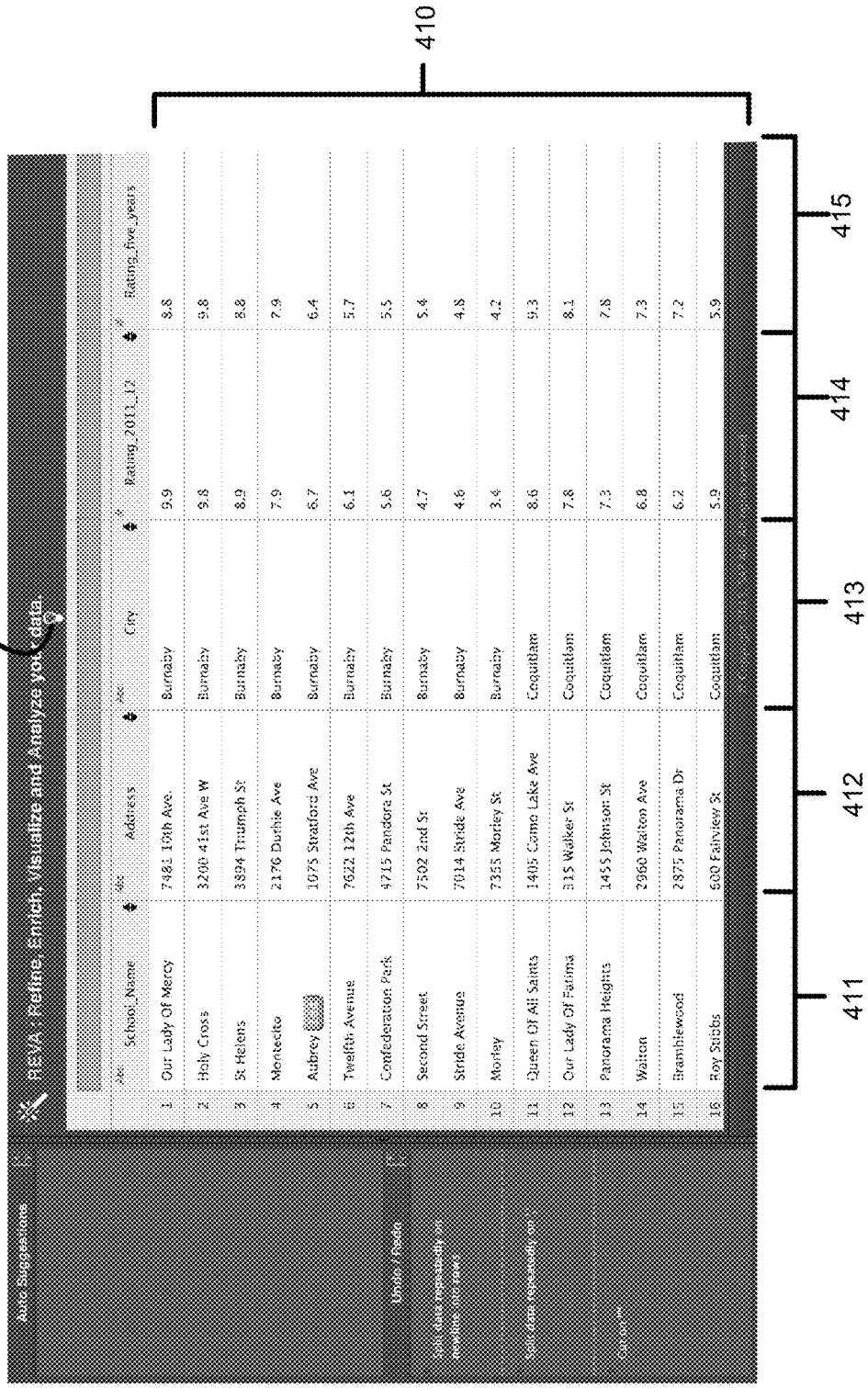
FIG. 4a illustrates a screenshot of an application enriching data according to one embodiment.
Figure 4B:
FIG. 4b illustrates a screenshot of an application enriching data according to one embodiment.

FIGS. 4a and 4b illustrate a screenshot of an application enriching data according to one embodiment. The application can evaluate data within dataset 150 and provide context to the data based on the evaluation. Providing context to the data can be beneficial since the meaning of the data can be determined. This can allow the application to automatically search for and provide additional information to further enrich the data. For example, the application can provide additional information from open databases 130 to enrich dataset 150.

FIG. 4a illustrates a screenshot of an application enriching data according to one embodiment. Screenshot 400 includes table 410. The application can analyze table 410 to determine whether the context of data in table 410 can be determined. The analysis can include comparing data in table 410 against a database of entity tags stored on client 140 or server 110. The database of entity tags can be organized into entity collections where each entity collection belongs to a category. In one example, the application can evaluate the entries in a row or column of table 410 for commonalities to determine whether all the entries in the row or column belong to the same category. The evaluation can include determining that all entries in a column belonging to a category. Examples of categories include cars, names of drugs, and cities. For instance, the application can evaluate table 410 to determine that all the entries in column 412 are addresses (e.g., all end in "Ave," "St," or "Dr") and that all the entries in column 413 are cities (e.g., all entries are city names in a city name database).

In another example, the header of each row or column can be evaluated to determine the type of data stored in the row or column. In yet another example, metadata collected along with the data can be evaluated to provide context to the data. For instance, the web address where the data was collected, the time of day in which the data was collected, the web server's stored metadata that is associated with the data (e.g., name of object on the web server, description of object on the web server, filename on the web server, etc.). In yet other examples, the application can perform a combination of the above to determine the context of the data. For instance, the header of a column can be first used to narrow the potential entity tags, followed by an evaluation of the metadata collected and entries in the column.

Here, the application has analyzed table 410 and based on the entity tag database and table 410, has suggested that column 413 belongs to a category. As a result, the application can present icon 450 to indicate that the suggested category is available for column 413. The analysis can include matching a subset of the entries in column 413 with entity tags that belong to an entity collection. The matching can include text matching the plain text of an entry in column 413 with the text field of an entity tag. If the names are the same, a match is found. In other examples, other icons or indicators can be used to signify a result related to the context of the dataset.

FIG. 4b illustrates a screenshot of an application enriching data according to one embodiment. Screenshot 400 can be presented when icon 450 is selected from FIG. 4a. As shown, selection of the icon can cause the application to present window 460. Window 460 is configured to confirm whether the suggested context is accurate. Window 460 includes the text "Data in this column identified as City. Do you wish to add geocode data?" along with a "Yes" and "No" icon to the user to confirm or deny the suggested context. If the "Yes" icon is selected, the application can set an entity tag to the column or to each entry in the column. The entity tag can be used to indicate that the column or entry is a geocode. This can allow the application to search available resources and link additional information related to the city to an entry, thus enriching the data stored in table 410. The additional information can come from web server 120, open access database 130, or database 112, to name a few.

In some embodiments, setting an entity tag on a column or entry can cause the application to supply data to be added into additional columns of table 410. For example, the application can add in additional columns for storing longitude and latitude values and populate the additional columns based on the tagged entity or column.

Figure 5:
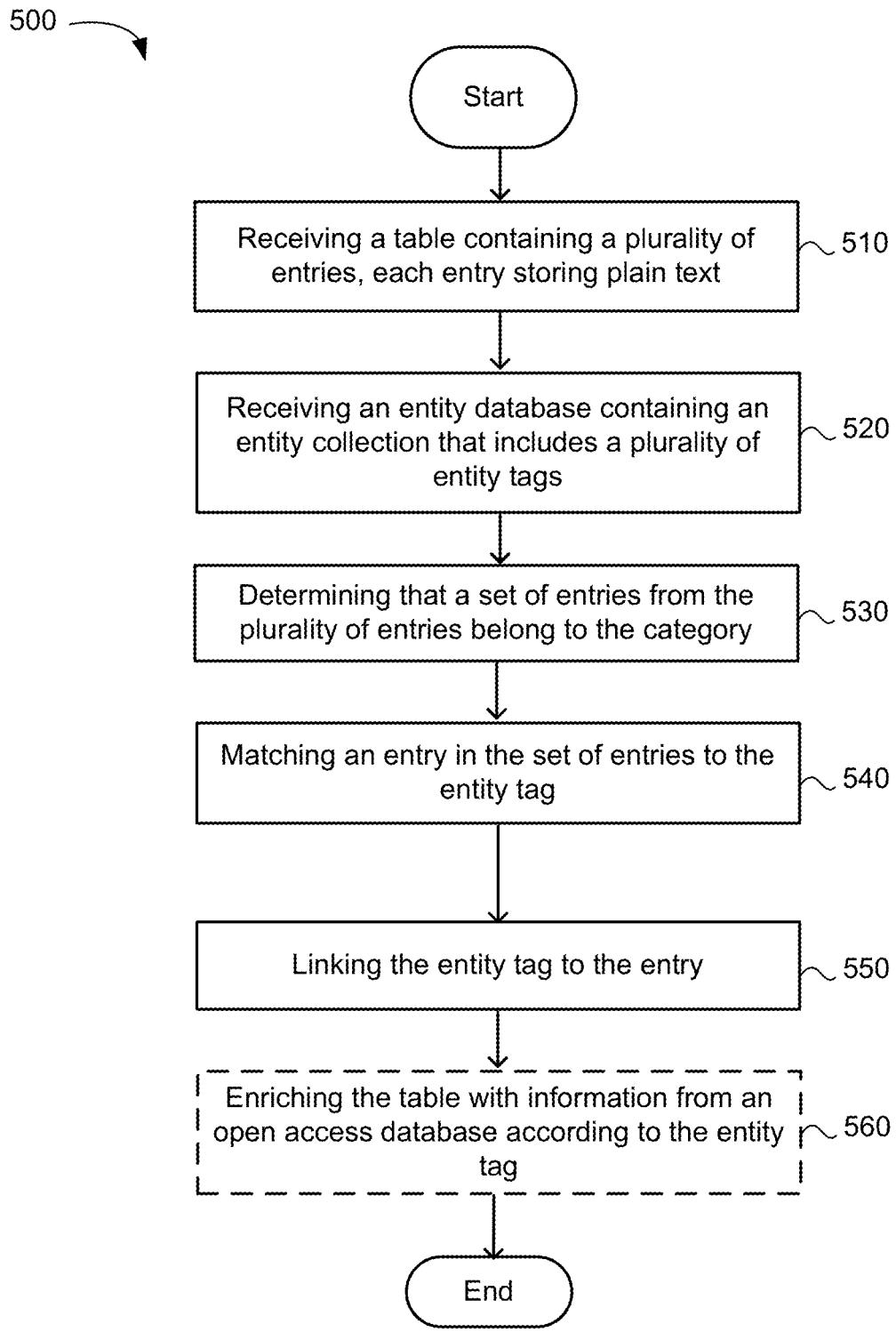
FIG. 5 illustrates a process to enrich a table according to one embodiment.

FIG. 5 illustrates a process to enrich a table according to one embodiment. Process 500 can be stored in computer readable code and executed by a computer. Process 500 begins by receiving a table containing a plurality of entries, each entry storing plain text at 510. In one example, the table can be received by detecting an input representative of selecting an area of a web page, determining that the area of the web page encompasses or substantially encompasses a table, and scraping the table from the web page. Process 500 can then continue by receiving an entity database containing an entity collection, the entity collecting including a plurality of entity tags that belong to a category, wherein an entity tag from the plurality of entity tags is linked with information from an open access database at 520. In other examples, the entity database can be stored locally and does not need to be received.

Once the table has been received, process 500 can continue by determining that a set of entries from the plurality of entries belong to the category at 530. In one example, this is performed by matching a subset of the set of entries with one of the plurality of entity tags. Thus, some of the entries from the set of entries are sampled to determine whether the set of entries belong to the category. This can include matching the plain text in an entry with the plain text stored within an entity tag. Only some of the entries may be checked to save processing time. Process 500 then continues by matching an entry in the set of entries to an entity tag of the entity collection at 540. Once a match is found, process 500 continues by linking the entity tag to the entry at 550. Linking can include setting metadata of the entry to a pointer of the entity tag. In other examples, the entity tag can replace the plain text in the entry. Optionally, process 500 can continue by enriching the table with information from the open access database according to the entity tag at 560. This can include associating (or linking) an article from the open access database to the entry based on the entity tag. In another example, this can include generating new columns or rows in the table to import information from the open access database.

Generating Interactive Infographics

Figure 6:
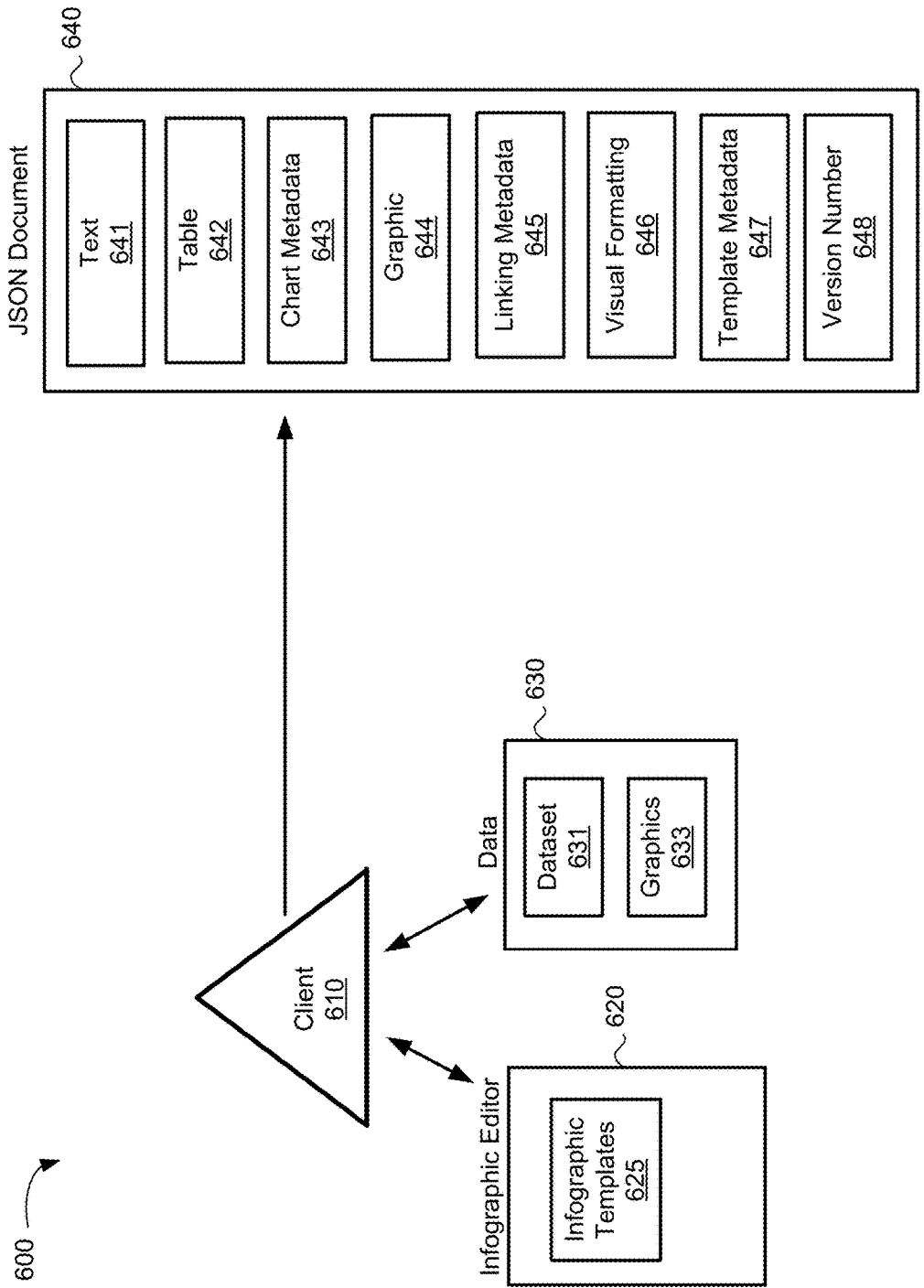
FIG. 6 illustrates a system for creating an infographic according to one embodiment.

FIG. 6 illustrates a system for creating an infographic according to one embodiment. System 600 includes client 610. Client 610 is an electronic device capable of running applications and storing data. Client 610 stores data 630. Data 630 includes dataset 631. In some examples, dataset 631 can include tables from dataset 150 of FIG. 1. Data 630 further includes graphics 633, which can include images, drawings, figures, and other visuals that have been collected or generated by client 610.

Client 610 also stores infographic editor 620. Infographic editor 620 is an application for creating and editing infographics. An infographic is a presentation of information in a visually appealing manner that enhances the ability of the audience to process the information clearly and quickly. For example, the presentation can include content that is presented in the form of charts and graphs rather than raw data since it is easier for an audience to see patterns and trends by using charts and graphs. In one embodiment, infographic editor 620 can create an infographic based on a template from infographic templates 625. Each template can specify a layout for objects in the infographic and also default settings for the visual appearance of each object in the layout. The objects can include text, tables, charts, visuals, and sounds. Some of these objects can be selected from graphics 633 or based off of dataset 631. For example, the infographic can be based on an infographic template that specifies the infographic will have a title with a first visual appearance (size, font, color, etc.) to occupy a space at a first location of the infographic, a text object with a second visual appearance to occupy another space at a second location of the infographic, and a chart having a specified background color and border to occupy another space at a third location of the infographic. Infographic editor 620 can include a user interface to allow a builder to create an infographic by selecting and entering the content that makes up the infographic.

Once the builder is satisfied with the infographic, infographic editor 620 can generate JSON document 640. JSON document 640 contains the content and metadata for rendering the infographic on a client device. This can include the text, charts, underlying tables that are the data source for the charts, graphics, layout, and visual formatting that make up the infographic. Here, JSON document 640 can include one or more of text 641, table 642, chart metadata 643, graphic 644, linking metadata 645, visual formatting 646, template metadata 647, and version number 648. Text objects 641 are blocks of text that occupy a space in the infographic. Table 642 contain the underlying data used to generate charts, graphs, and other graphical representations of data. Chart metadata 643 contains the parameters for a chart. The parameters can include a chart type (bar graph, pie chart, or other graphical representation used for visualizing data) and a pointer to an underlying table that is used to generate the chart. The underlying table can be table 642 or another table not stored on JSON document 640. If the underlying table is not a part of JSON document 640, the table may need to be downloaded to a client device before the infographic can be rendered. Graphic 644 contains a graphic that is shown in the infographic. Linking metadata 645 contains linking data to link together two or more objects in the infographic. The two objects can be a text object and a chart object, two text objects, or other combinations of objects. A modification to a linked object can be propagated to other linked objects. Visual formatting 646 contains formatting for the visual appearance of the infographic, which include the visual appearance for the objects in the infographic. Template metadata 647 contains data specifying an infographic template which the infographic is based on. Version number 648 contains the version number of this infographic. This can be particularly useful for version control when multiple builders are modifying the same infographic. In one example, JSON document 640 can be transmitted from client 610 to another client device as an HTML page and rendered on a web browser running on the another client device. The web browser can execute a dedicated applet to render JSON document 640 into an infographic. In another example, the JSON document can be transmitted from client 610 to another client device, where the another client device renders JSON document 640 into an infographic by using a dedicated application. In other examples, JSON document 640 can be a different format having data structures for storing the parts of an infographic.

Figure 7:
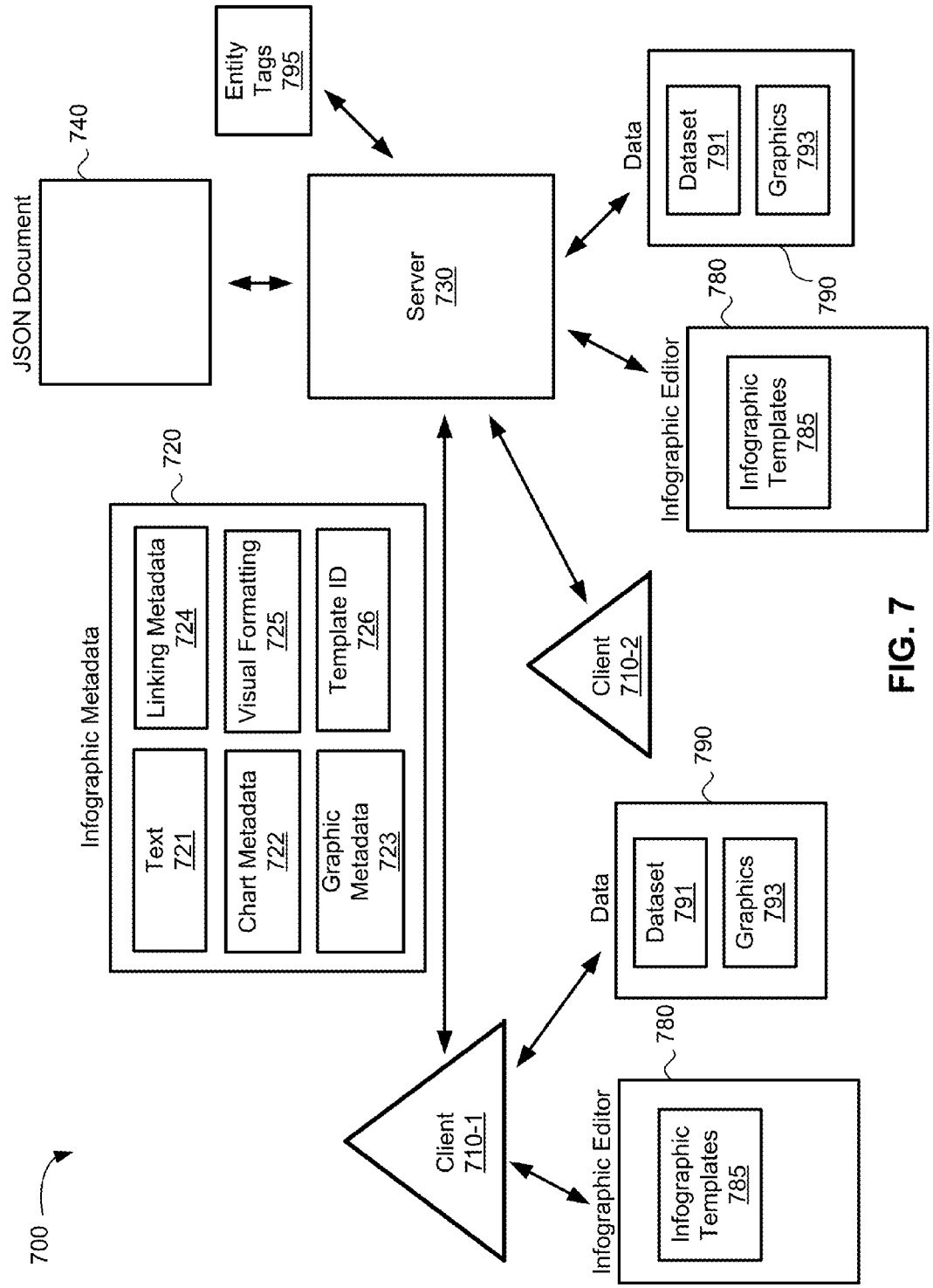
FIG. 7 illustrates a system for creating an infographic according to another embodiment.

FIG. 7 illustrates a system for creating an infographic according to another embodiment. System 700 includes client 710-1, client 710-2, and server 730. Client 710-1 can be similar or substantially similar to client 610 of FIG. 6. Client 710-1 can create an infographic using infographic editor 780. The infographic can include a table from dataset 791 and a graphic from graphics 793. Once the infographic has been created, infographic editor 780 can generate and transmit infographic metadata package 720 to server 730. Infographic metadata package 720 can be a lighter version of JSON document 740. Since client 710-1 and server 730 both store a copy of dataset 791 and graphics 793, metadata identifying the table from dataset 791 and the graphic from graphics 793 can transmitted from client 710-1 to server 730 rather than the tables and graphics themselves. This can minimize the amount of data transmitted between client 710-1 and server 730, thus preserving network bandwidth. Infographic metadata package 720 can include one or more of text object 721 containing one or more bodies of text, chart metadata 722 that specifies chart parameters for generating a chart such as the type of chart and a pointer identifying a table containing data to generate the chart, graphic metadata 723 that identifies a graphic, linking metadata 724 that links two objects together, visual formatting 725 for one or more objects in the infographic, and template ID 726 to identify the infographic template that was used to generate the infographic.

In one embodiment, server 730 can perform version management on the infographic. This can be useful when multiple clients are modifying the infographic. For example as client 710-1 makes changes to the infographic, the changes (i.e., deltas) can be transmitted to server 730. Server 730 can update JSON document 740 on the server based on the changes received and assign an incremented version number to updated JSON document 740. When another client (not shown) is synced with server 730, server 730 can determine whether the version number of the infographic stored on the client is up to date. If it is not, server 730 can transmit infographic metadata package 720 to the client to update the infographic stored on the client. This can allow changes made by one client to be propagated to another client.

In another embodiment, a client can utilize the infographic editor on the server to modify an infographic. Client 710-2 can transmit a request to the server 730 to receive the infographic. Server 730 can in turn transmit JSON document 740 to client 710-2 for rendering on client 710-2. When the infographic is rendered, client 710-2 can transmit instructions to modify the infographic to server 730. Server 730 can receive the instructions and execute the instructions using infographic editor 780. The modified infographic can be saved as updated JSON document 740. Once updated, server 730 can retransmit JSON document 740 back to client 710-2 to be rendered as an updated infographic.

In another embodiment, server 730 further includes entity tags 795. Entity tags 795 can be used to enrich data in data 790 with additional information that is available from a remote source. The additional information can be used in generating the infographic. For example, reference objects from an open access database can be imported and added to a space at a location in the infographic.

Figure 8:
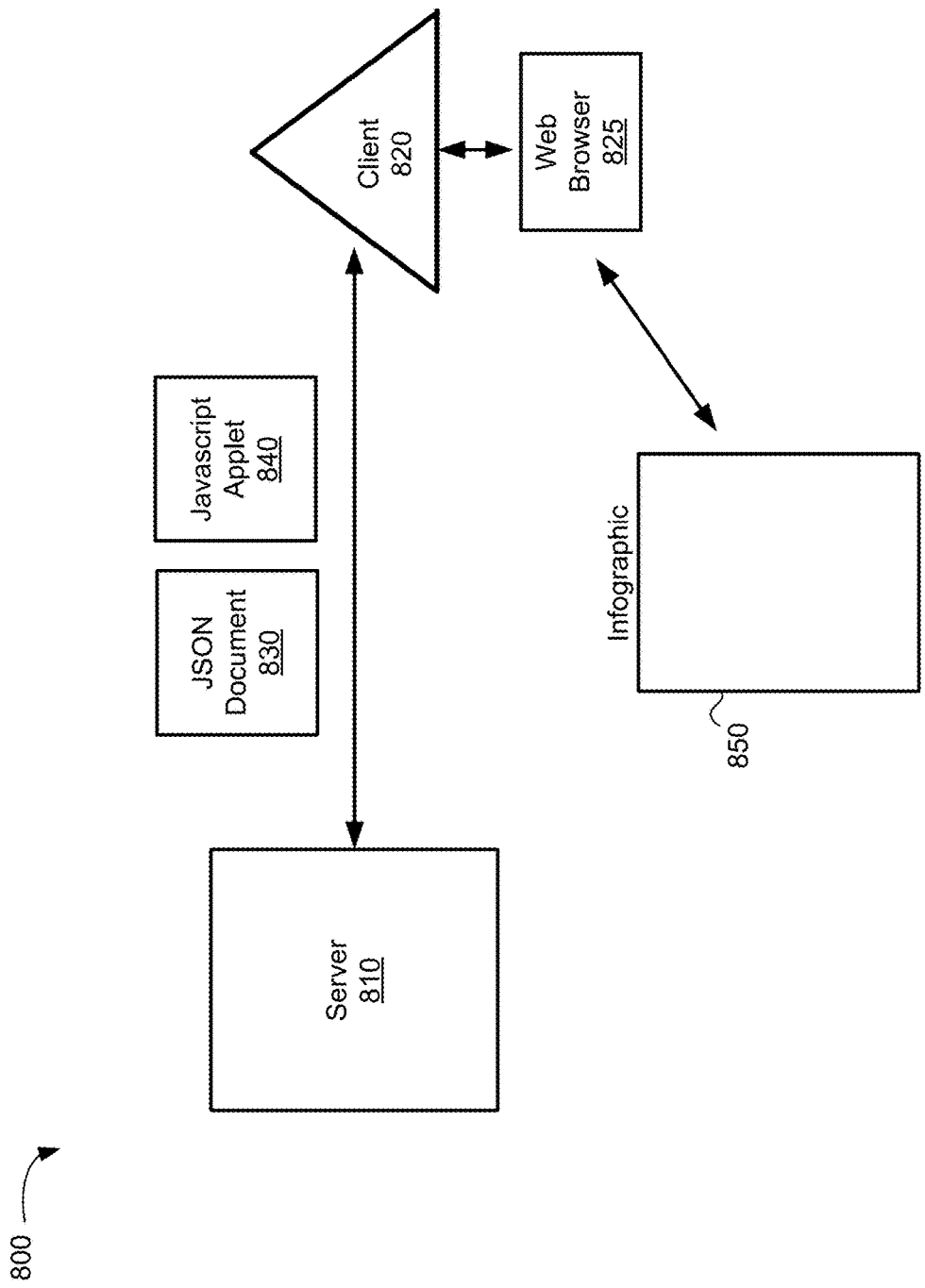
FIG. 8 illustrates a system for presenting infographics according to one embodiment.

FIG. 8 illustrates a system for presenting infographics according to one embodiment. System 800 includes server 810 and client 820. Upon receiving a client request to present infographic 850, server 810 can transmit JSON document 830 and JavaScript applet 840 to client 820. In some examples, JSON document 820 can be any document format capable of storing the content of infographic 850 and JavaScript applet 840 can be any application capable of rendering infographic 850 from the corresponding document format. Here, client 820 receives JSON document 830 and JavaScript applet 840. Client 820 can execute JavaScript applet 840 on web browser 825 to render JSON document 830 as interactive infographic 850. In other embodiments, server 810 can skip transmitting JavaScript applet 840 if client 820 has an application capable of rendering JSON document 840 into infographic 850. In these embodiments, client 820 can simply receive JSON document 840 and render infographic 850 using the dedicated application.

In some embodiments, infographic 850 can be interactive. Client 820 can interact with infographic 850 by modifying linked objects within infographic 850. This can dynamically update the content of infographic 850 and as a result, change the theme, message, or point of view of infographic 850. For example, charts, graphs, or other visuals of infographic 850 can be dynamically updated by modifying linked objects. The updated charts, graphs, or other visuals can convey a different message which can lead to a change in the theme or point of view of infographic 850. In one embodiment, client 820 can include an aggregation engine (not shown). The aggregation engine is configured to aggregate data from JSON document 830 to generate updated charts, graphs, or other visuals. For example, the aggregation engine can aggregate data from a table to regenerate a chart using a different constraint. The different constraint can be received through a modification to a linked object. In one example, client 820 can interact with infographic 850 as it is being presented by an infographic editor. In another example, client 820 can interact with infographic 850 as it is being presented on web browser 825.

Figure 9A:
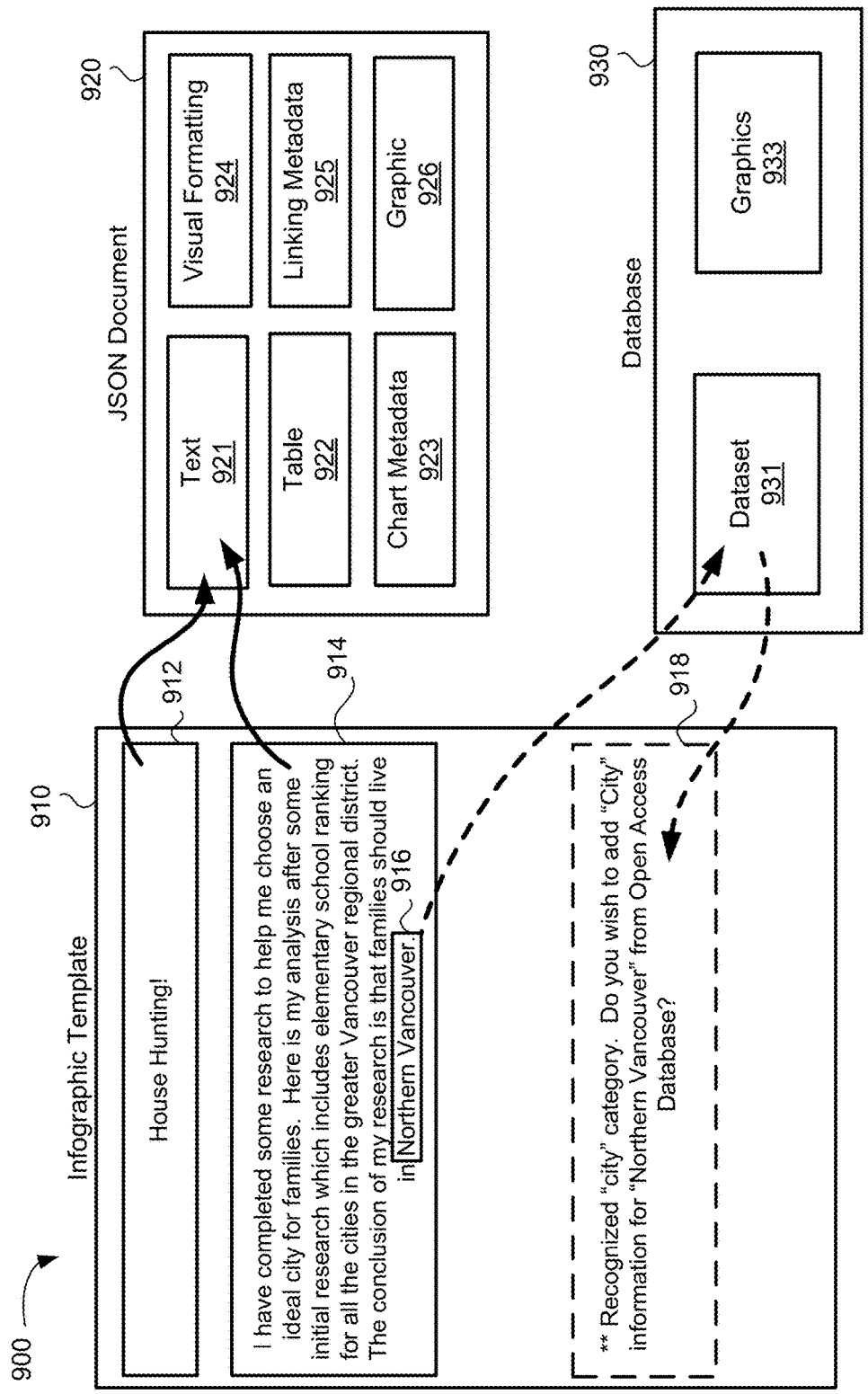
FIG. 9a illustrates an infographic editor according to one embodiment.

FIG. 9a illustrates an infographic editor according to one embodiment. Infographic editor 900 can be configured to incorporate additional information from a remote source such as an open access database into the infographic. Infographic editor 900 includes a graphical user interface that is presenting portion 910 of an infographic template. Portion 910 includes object space 912 for entering a title and object space 914 for entering a block of text. When the text "House Hunting" is entered into object space 912, infographic editor 900 can store the entered text in text container 921 of JSON document 920. Similarly when text is entered into object space 914, infographic editor 900 can store the entered text also in container 921 of JSON document 920. JSON document 920 also includes containers table 922, chart metadata 923, visual formatting 924, linking metadata 925, and graphic 926 for storing other content and attributes of the infographic.

In one embodiment, infographic editor 900 can actively scan entered text to determine whether a text string matches a known entity tag. For example, infographic editor 900 can dynamically match entered text to data in dataset 931. In other examples, matching can be performed with entity tags found in dataset 931 or in an entity tag database stored on the client or the server. Here, text string 916 matches an entry in a table of dataset 931 that is associated with an entity tag. Infographic editor 900 can respond to the matching by presenting prompt 918 to inquire whether additional information from the remote source that is linked to the entity tag should be incorporated into the infographic.

Figure 9B:
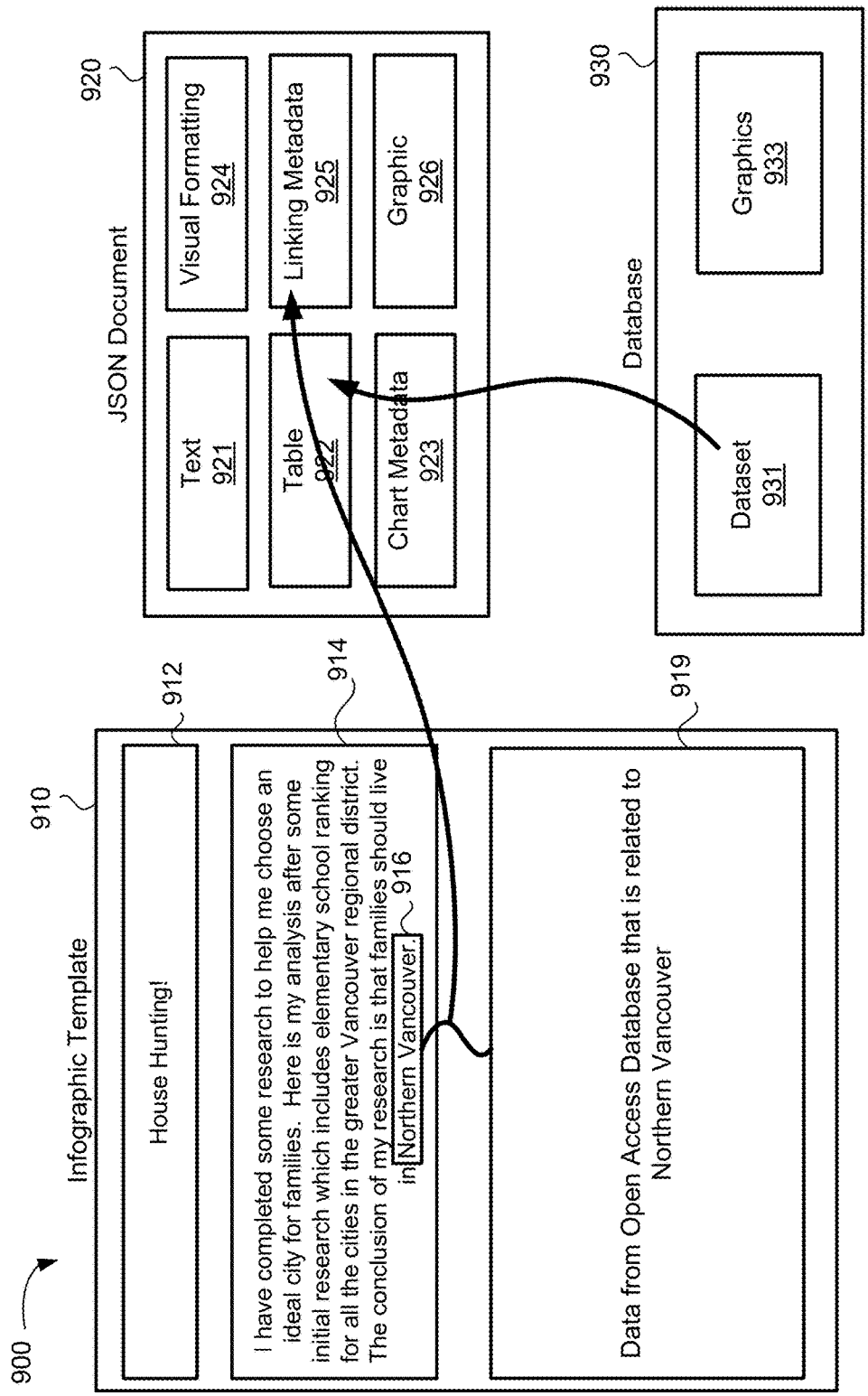
FIG. 9b illustrates an infographic editor incorporating data from a remote source into an infographic according to one embodiment.

FIG. 9b illustrates an infographic editor incorporating data from a remote source into an infographic according to one embodiment. FIG. 9b can be a continuation from FIG. 9a after infographic editor 900 receives an instruction to incorporate the additional information into the infographic. In one embodiment, infographic editor 900 can add object space 919 to portion 910 for presenting the additional information from the remote source in response to the instruction. In one example, object space 919 can be positioned directly below object space 914 which contains text string 916 that was matched with an entity tag. Infographic editor 900 can communicate with the remote source to retrieve the reference object that corresponds to the entity tag. Once the reference object is received, it is presented within object space 919. In one embodiment, infographic editor 900 can combine the reference object received with the text in object space 914 when the reference object is a body of text.

In another embodiment, infographic editor 900 can create an interactive feature for the infographic that dynamically updates the additional information presented from the remote source in object space 919. This allows the additional information that is retrieved and displayed by the infographic to change depending on a control variable. In one example, infographic editor 900 converts text string 916 into the control variable. This can include setting a parameter of text string 916 or changing the type of text string 916. Infographic editor 900 can also change the visual appearance of text string 916 so that it is different than the rest of the text in object space 914 to signify that text string 916 is a control variable. For example, text string 916 can be bolded, underlined, or be surrounded by brackets. When the infographic receives an input representative of selecting the control variable, a plurality of values can be presented to the user. Each of the plurality of values represents a potential value that the control variable can be set to. Another input representative of selecting a value from the plurality of values can set text string 916 to a different value, thereby adjusting the control variable. In one example, text string 916 is a property (i.e., category) of a table and the plurality of values can be other properties in the table. In another example, text string 916 is a value set within an entry that belongs to a property of the table and the plurality of values can be the values set within other entries that belong to the same property. To identify the plurality of values, the table from dataset 931 can be stored in table container 922 of JSON document 920.

After converting text string 916 into a control variable, infographic editor 900 can link the control variable with object space 919. By linking the two objects together, the infographic can automatically update object space 919 when the control variable is modified. The link between object space 919 and the control variable can be stored in linking metadata container 925 of JSON document 920. When JSON document 920 is rendered into the infographic, linking metadata 925 can be processed to convert text string 916 that is part of the text object presented in object space 914 into a control variable that is linked to an entity tag from an entry in a specified table stored in table container 922. Linking metadata 925 can also describe a relationship between text string 916 and the specified table, thus allowing the plurality of values available to the control variable to be determined.

Figure 10A:
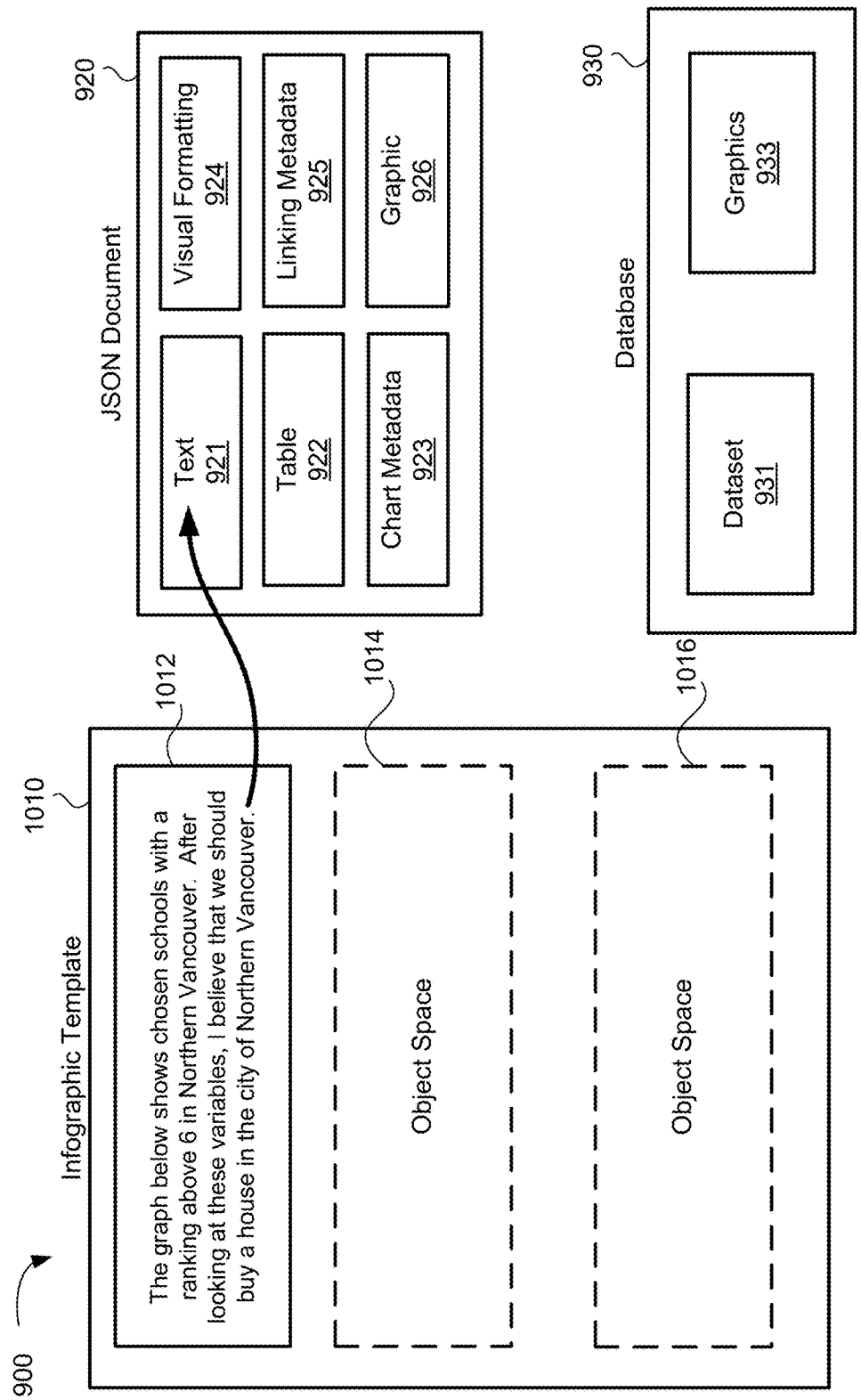
FIG. 10a illustrates an infographic editor receiving text according to one embodiment.

FIG. 10a illustrates an infographic editor receiving text according to one embodiment. Infographic editor 900 includes a graphical user interface that is presenting portion 1010 of the infographic template. Portion 1010 and portion 910 of FIG. 9 can belong to the same infographic template. Portion 1010 includes objects spaces 1012, 1014, and 1016. The infographic editor can detect that an input representative of entered text is received in object space 1012. Upon detecting the entered text, infographic editor can present the entered text in object space 1012 and store the entered text as a text object in text container 921. A pointer can be stored with the text object to identify the text object as being presented in object space 1012 of portion 1010.

Figure 10B:
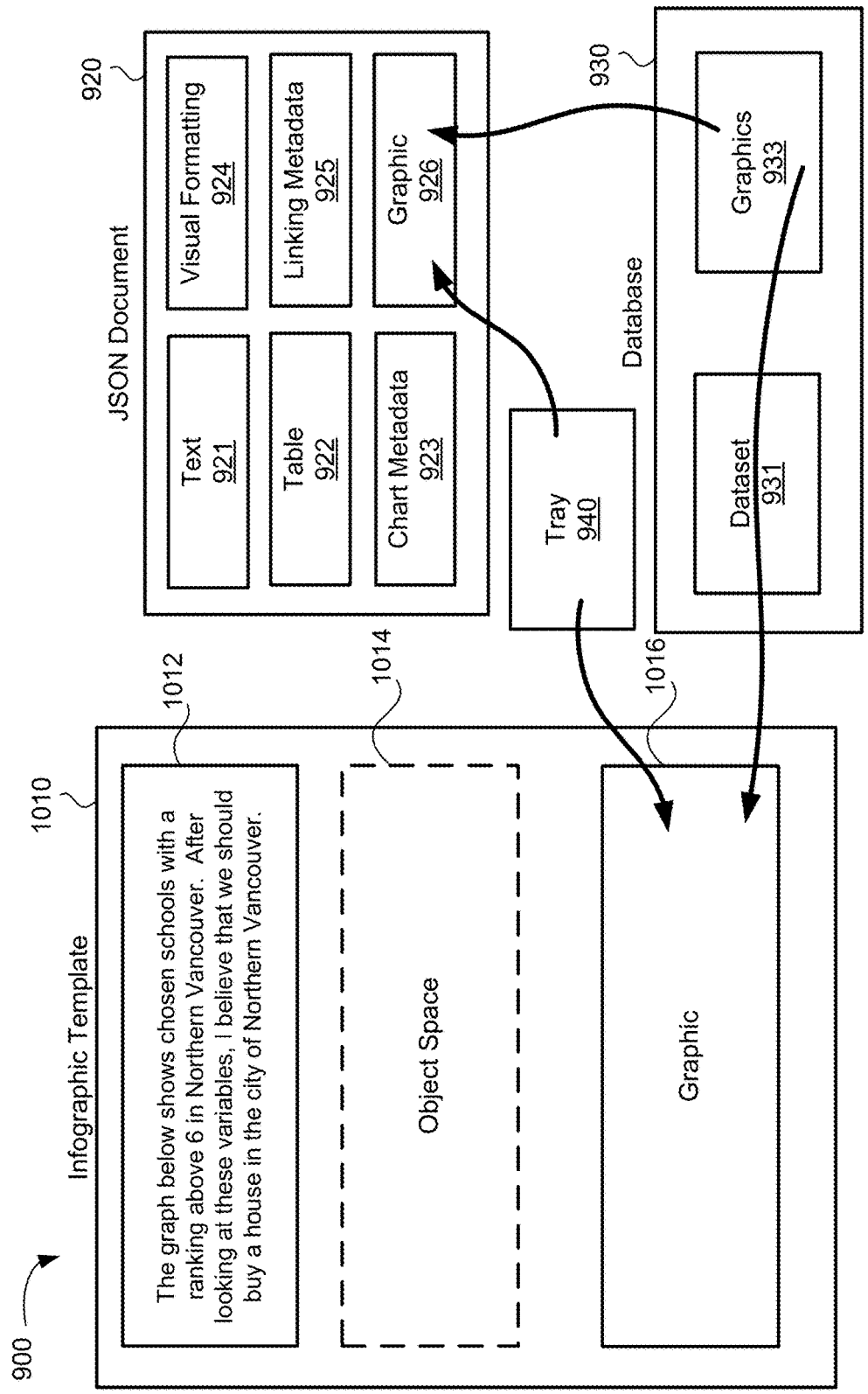
FIG. 10b illustrates an infographic editor receiving a graphic according to one embodiment.

FIG. 10b illustrates an infographic editor receiving a graphic according to one embodiment. Infographic editor 900 receives an input representative of selecting a graphic object to be placed in object space 1016 of portion 1010. The graphic object can be selected from tray 1040 of cached objects or can be selected from graphics 933 of database 930. In one example, the input is a dragging movement where the graphic object is selected and dragged onto object space 1016 from tray 940. Upon receiving the input, infographic editor 900 can present the graphic object in object space 1016 and store the graphic object (or an identifier or pointer associated with the graphic) in graphic container 926. Graphic container 926 can also store the location where graphic object is to be presented in the infographic.

Figure 10C:
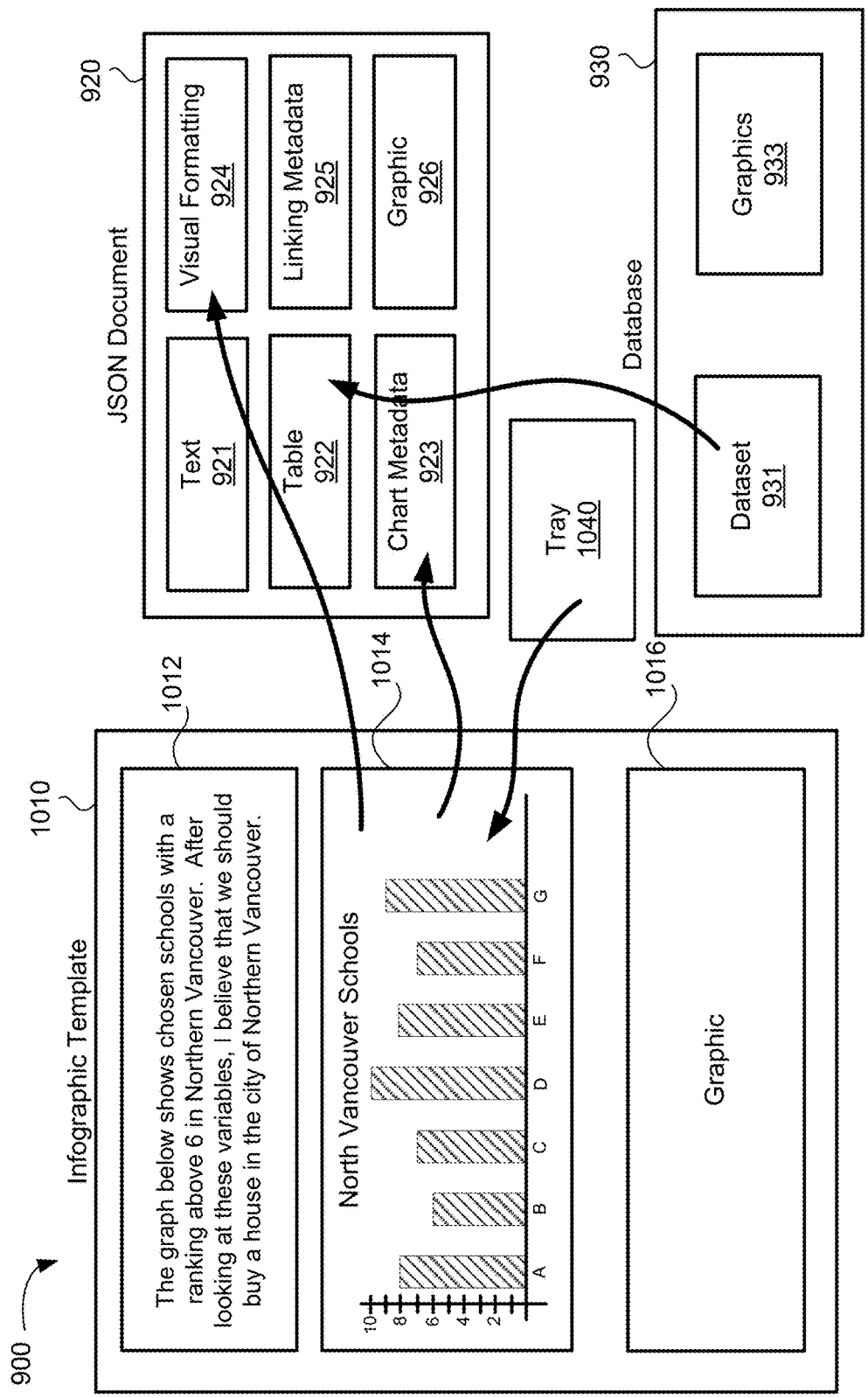
FIG. 10c illustrates an infographic editor receiving a chart according to one embodiment.

FIG. 10c illustrates an infographic editor receiving a chart according to one embodiment. Infographic editor 900 receives an input representative of selecting a chart object to be placed in object space 1014 of portion 1010. The chart object can be selected from tray 1040 of cached objects. In one example, the input can be a drag gesture dragging the chart object from tray 1040 onto object space 1014 of portion 1010. Once the chart object has been placed in object space 1014, infographic editor 900 can determine the underlying table or dataset with which the chart object was generated from. The underlying table or dataset (or a pointer or link to the underlying table or dataset) is then stored in table container 922 of JSON document 920. This can allow the chart object to be dynamically change in response to user input. Infographic editor 900 can also determine and store properties of the chart such as the chart type, chart scale, and chart constraints in chart metadata container 923. Metadata related to the visual appearance of the chart can be stored in visual formatting container 924.

Figure 10D:
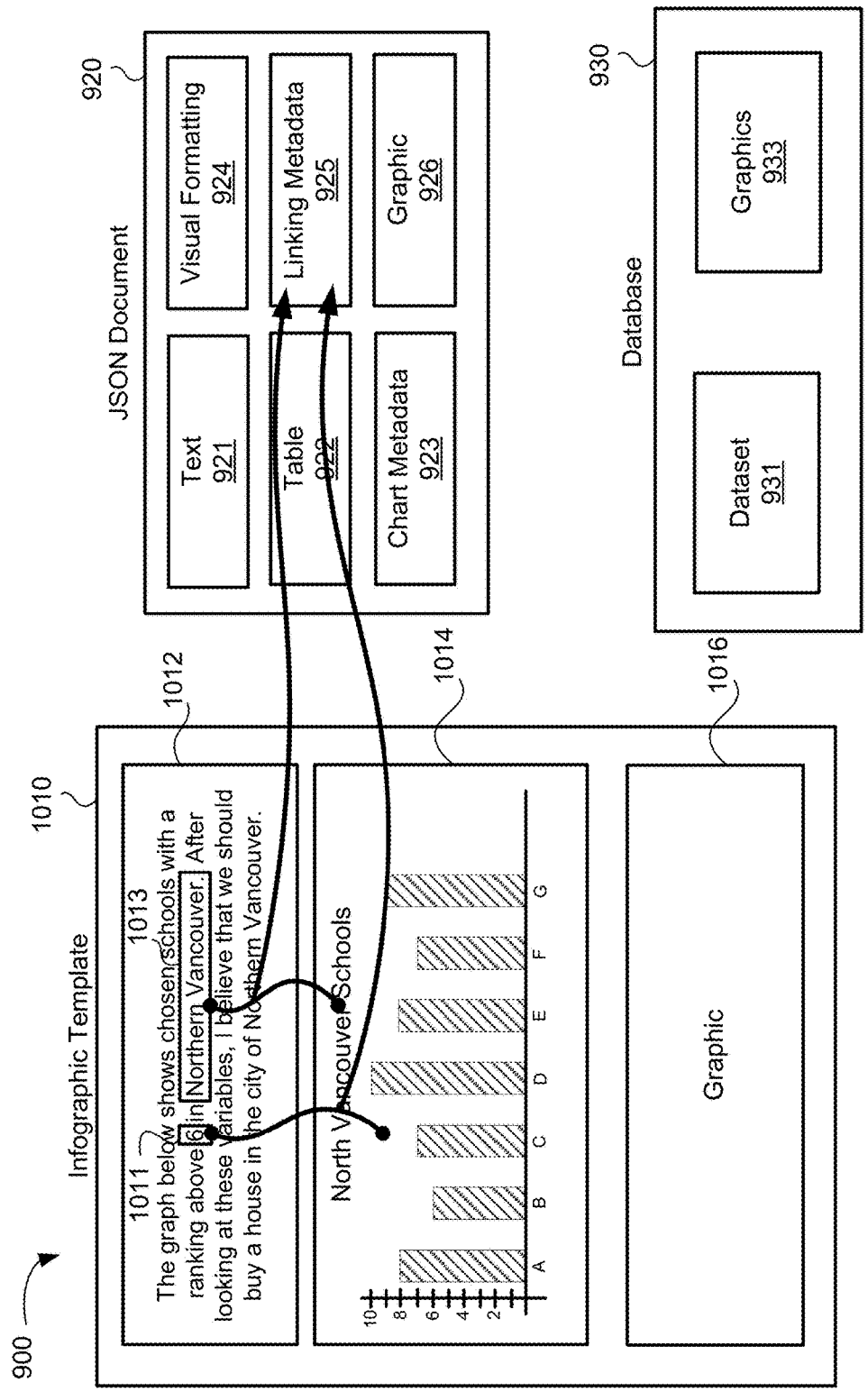
FIG. 10d illustrates an infographic editor processing a request to link text to a chart according to one embodiment.

FIG. 10d illustrates an infographic editor processing a request to link text to a chart according to one embodiment. Portion 1010 of the infographic template is shown containing three object spaces that each contain an object. A text object is presented in object space 1012, a chart object is presented in object space 1014, and a graphic object is presented in object space 1016. In some examples, one or more objects can be associated with one another so that adjustments or modifications made to one object can trigger adjustments or modifications to other linked objects.

Infographic editor 900 receives an input representative of associating text string 1011 and the chart object in object space 1014. When the input is received, infographic editor 900 can determine the relationship between text string 1011 and the chart object. This can include evaluating the context of the text string 1011 by evaluating text surrounding text string 1011. Here, infographic editor 900 evaluates the text surround text string 1011 and the chart object in object space 1014 to determine that text string 1011 is a constraint on a category "North Vancouver." Text string 1011 of "6" describes a constraint on the Northern Vancouver schools that are presented by the chart object since only schools in the category of Northern Vancouver schools with a ranking above 6 are presented on the chart object. In another example, the relationship can be that the text string is an upper value limit to a category in a table that is being presented by the chart object. In yet other examples, the relationship can be based on some other mathematical calculation such as the mean, median, average, etc. Once the relationship has been determined, infographic editor 900 can convert text string 1011 to a control variable according to the determined relationship.

The control variable can be configured to be set to one of a plurality of values which are determined according to the relationship and the data in the underlying table. Here, the relationship is that the control variable is the lower limit of which schools from North Vancouver are presented in the chart object. As a result, infographic editor 900 can configure the control variable to be set to a value which is between the lowest rated school and the highest rated school from North Vancouver in the underlying table. Infographic editor 900 can also link the control variable to the chart object in object space 1014. This can cause the chart object to be dynamically updated when the control variable is modified. The linking metadata can be saved in linking metadata container 925 of JSON document 920. In some examples, an aggregation engine can be used to dynamically update the chart object.

Infographic editor 900 receives another input representative of associating text string 1013 and the chart object in object space 1014. Infographic editor 900 examines the relationship between text string 1013 and the chart object to determine that text string 1013 is the name of a category of the underlying table that is being presented by the chart object. As a result, the relationship is that the text string 1013 is a parameter for selecting a category or property of the underlying table that is to be graphically represented by the chart object. Upon the determination, infographic editor 900 can convert text string 1013 into a control variable that can be set to a plurality of predefined values, the values being other properties in the underlying table. The other properties from the underlying table can be identified by analyzing the underlying table. Once text string 1013 has been converted to a control variable, infographic editor 900 can link the control variable to the control object in object space 1014. Data that describes the link between the control variable and the control object can be stored as linking metadata in linking metadata container 925 of JSON document 920. Once linked, the chart object in open space 1014 can be regenerated to present a chart on other properties of the underlying table when the control variable selects a different variable. In some examples, infographic editor 900 can change the visual appearance of the control variables so that it is different than the rest of the text in object space 1012. For example, control variables can be bolded, underlined, or be surrounded by brackets.

Figure 10E:
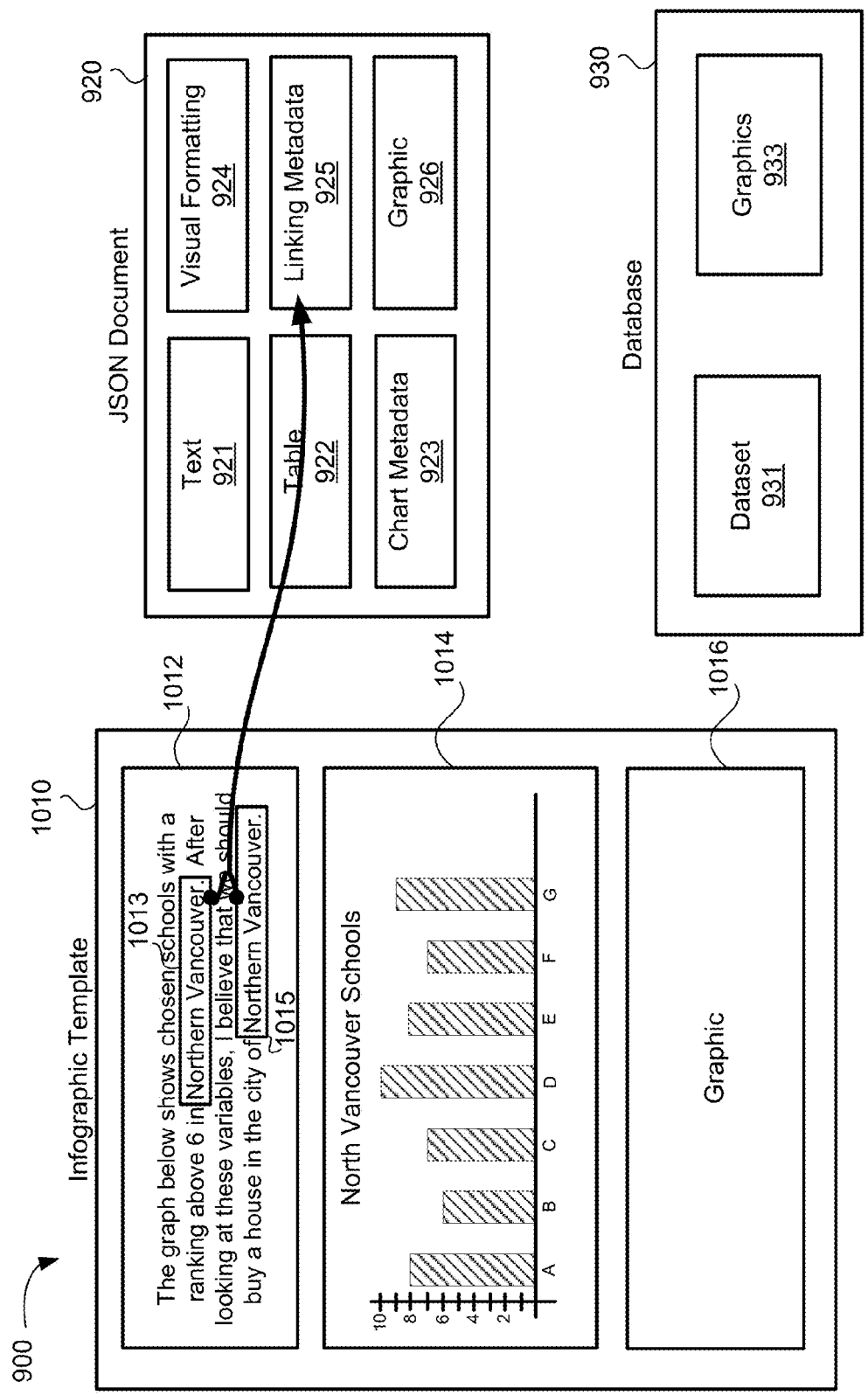
FIG. 10e illustrates an infographic editor processing a request to link text to text according to one embodiment.

FIG. 10*e* illustrates an infographic editor processing a request to link text to text according to one embodiment. Here, an input representative of associating text string 1013 to text string 1015 is received by infographic editor 900. The input can be a gesture connecting text string 1013 to text string 1015. After the input is received, infographic editor 900 can determine that the two text objects are of the same type. They are both text strings. When the linked objects are of the same type, infographic editor 900 can determine whether the two text objects match one another. If the two objects do match one another, they can be linked to each other. When objects of the same type are linked together, the changes made to one object can be propagated to the other. For example, the infographic can automatically change text string 1015 from "North Vancouver" to "Richmond" when a similar change is detected on text string 1013.

In some embodiments, infographic editor 900 can automatically link objects together when an object is linked to a previously linked object. For example input is received to link object A to object B when object B is already linked to object C. Infographic editor 900 can automatically link object C to object A due to the chain of linking. As a result, modifying object A can cause the infographic to automatically update object B and object C. Here, control variable generated from text string 1013 is linked to text string 1015. Infographic editor 900 can determine that the control variable is already linked to the chart object in object space 1014 and as a result, link text string 1015 also to the chart object. This can include converting text string 1015 to a control variable and linking the control variable to the control object in object space 1014. When the control variable which is text string 1013 is modified by a user, the control object which is text string 1015 can automatically be modified along and chart object in object space 1014 can also be dynamically regenerated. Similarly when control variable which is text string 1015 is modified by the user, the control object which is text string 1013 can be automatically modified and chart object in object space 1014 can also be dynamically regenerated.

Figure 11:
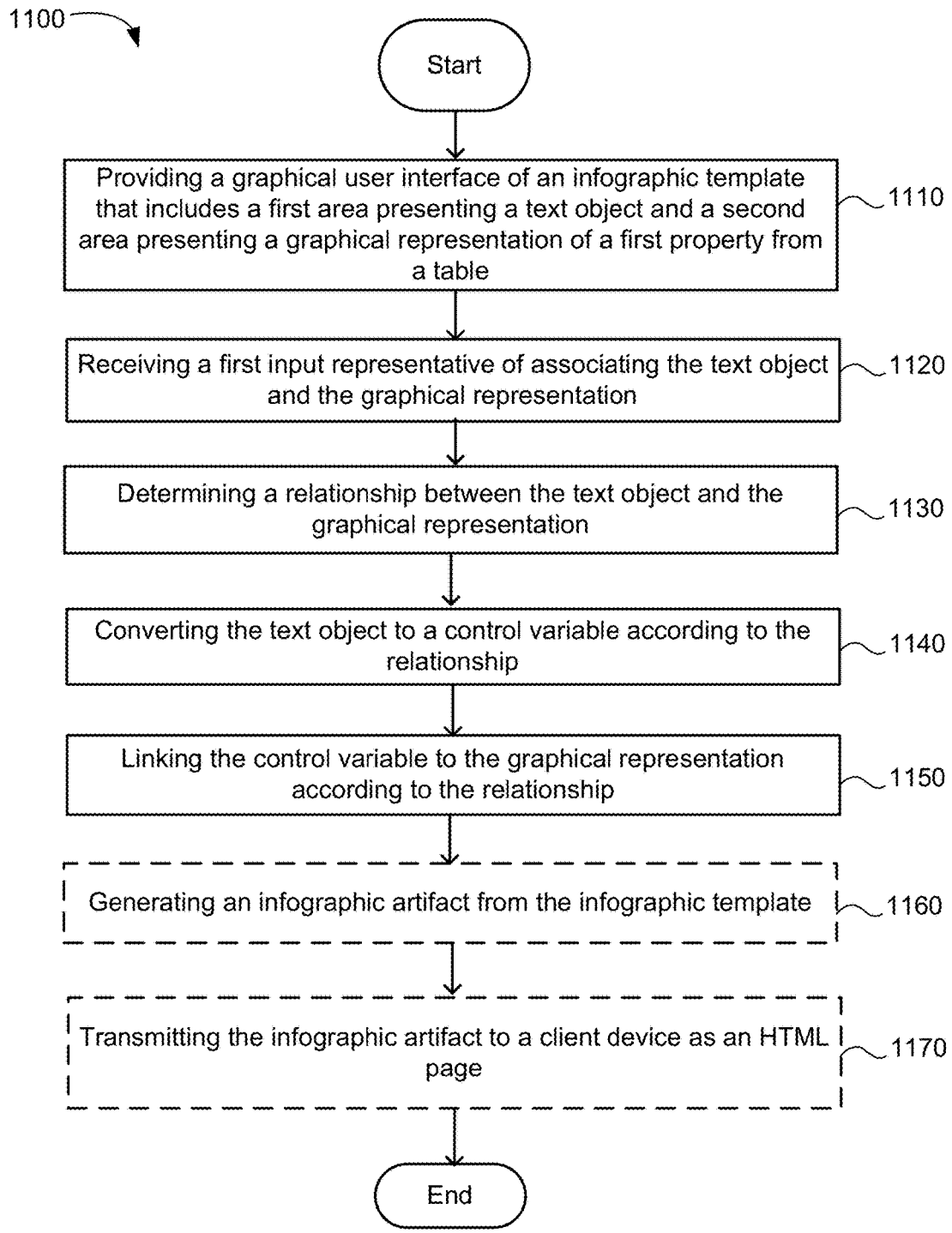
FIG. 11 illustrates a process to generate an interactive infographic according to one embodiment.

FIG. 11 illustrates a process to generate an interactive infographic according to one embodiment. Process 1100 can be stored in computer readable code and executed by a computer. Process 1100 begins by providing a graphical user interface of an infographic template that includes a first area presenting a text object and a second area presenting a graphical representation of a first property from a table at 1110. The text object can be a text string that is part of a body of text as described above. The graphical representation can be a chart, graph, or other visual used to graphically represent a portion of the table. Process 1100 can then continue by receiving a first input representative of associating the text object and the graphical representation at 1120. The first input can be a gesture that connects the text object to the graphical representation.

Once the first input has been received, process 1100 can continue by determining a relationship between the text object and the graphical representation at 1130. In one example, the relationship is that the text object is a first limit related to the first property. In another example, the relationship is that the text object is a first property name associated with the first property. Process 1100 then continues by converting the text object to a control variable according to the relationship at 1140. The control variable can be configured to be set to one of a plurality of values where the values depend on the data in the table and the relationship between the text object and the graphical representation. Once the text object is converted, process 1100 continues by linking the control variable to the graphical representation according to the relationship at 1150. Linking can include storing metadata that associates the two objects with one another. When the graphical representation is linked to the control variable, the graphical representation can be dynamically updated when an input is received that modifies the control variable.

Optionally, process 1100 can continue by generating an infographic artifact from the infographic template at 1160. The resulting infographic artifact can be configured to be rendered by a client device as a presentation that includes the control variable and the graphical representation. Process 1100 can also optionally continue by transmitting the infographic artifact to a client device as an HTML page. The HTML page can be rendered to present the infographic on the client device. In one example, the graphical representation is dynamically updated when the control variable is adjusted by the client device.

Figure 12:
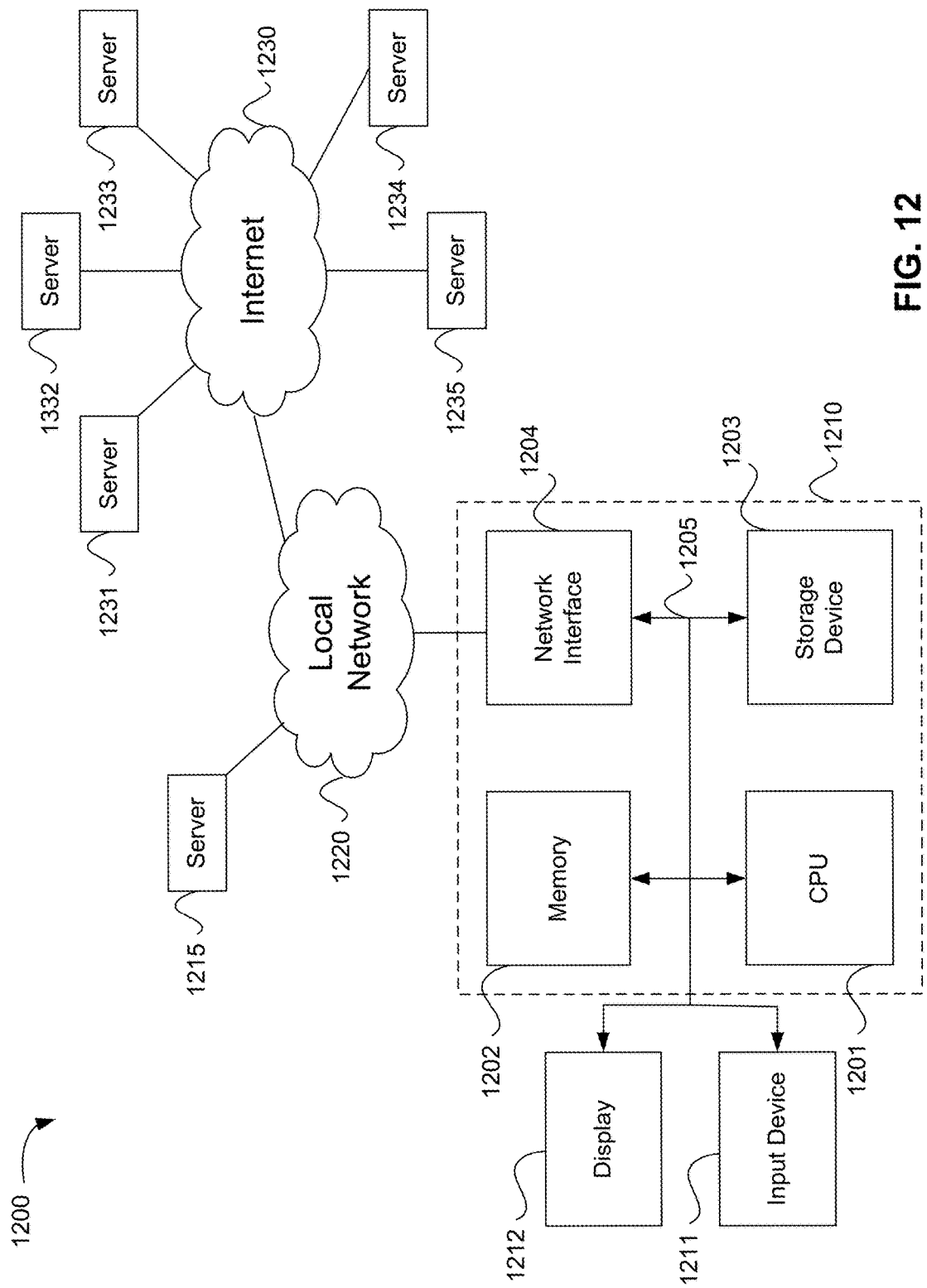
FIG. 12 illustrates an exemplary computer system according to one embodiment.

An exemplary computer system 1200 is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
    providing, by a processor, a graphical user interface of an infographic template that includes a first area presenting a text object and a second area presenting a graphical representation of a first property of data stored in a table contained in an infographic document that is used to generate the graphical representation;
    receiving, via the graphical user interface, a first input representative of a text string in the text object, and storing the first input in a text portion of the infographic document;
    receiving, via the graphical user interface, a second input representative of associating the text string in the text object and the graphical representation;
    determining, by the processor, a relationship between the text string in the text object and the graphical representation by matching the text string to an entry in the table, and storing the relationship in a linking metadata portion of the infographic document; and
    linking, by the processor, the text string in the text object as a control variable to the graphical representation according to the relationship by storing data in the linking metadata portion of the infographic document that describes the link between the text string to the graphical representation, wherein the graphical representation is dynamically updated when a third input is received that modifies the control variable.

2. The computer-implemented method of claim 1, further comprising:
    generating, by the processor, an infographic artifact from the infographic document, the infographic artifact being configured to be rendered by a client device as a presentation that includes the control variable and the graphical representation; and
    transmitting, by the processor, the infographic artifact to the client device as an HTML page, wherein the graphical representation is dynamically updated when the client device adjusts the control variable.

3. The computer-implemented method of claim 1, wherein the relationship is that the text string is a first limit related to the first property.

4. The computer-implemented method of claim 3, wherein the graphical representation is dynamically updated to constrain the range of values belonging to the first property that are represented by the graphical representation when the third input modifies the control variable to a second limit for the first property.

5. The computer-implemented method of claim 1, wherein the relationship is that the text string is a first property name associated with the first property.

6. The computer-implemented method of claim 5, wherein the graphical representation is dynamically updated to represent a second property of the data in the table when the third input modifies the control variable to a second property name associated with the second property.

7. The computer-implemented method of claim 1, wherein the infographic document is a JSON document.

8. A non-transitory computer readable storage medium storing one or more programs, the one or more programs comprising instructions for:
    providing a graphical user interface of an infographic template that includes a first area presenting a text object and a second area presenting a graphical representation of a first property of data stored in a table contained in an infographic document that is used to generate the graphical representation;
    receiving, via the graphical user interface, a first input representative of a text string in the text object, and storing the first input in a text portion of the infographic document;
    receiving, via the graphical user interface, a second input representative of associating the text string in the text object and the graphical representation;
    determining a relationship between the text string in the text object and the graphical representation by matching the text string to an entry in the table, and storing the relationship in a linking metadata portion of the infographic document; and
    linking the text string in the text object as a control variable to the graphical representation by storing data in the linking metadata portion of the infographic document that describes the link between the text string to the graphical representation, wherein the graphical representation is dynamically updated when a third input is received that modifies the control variable.

9. The non-transitory computer readable storage medium of claim 8, further comprising:
  generating an infographic artifact from the infographic document, the infographic artifact being configured to be rendered by a client device as a presentation that includes the control variable and the graphical representation; and
  transmitting the infographic artifact to the client device as an HTML page, wherein the graphical representation is dynamically updated when the client device adjusts the control variable.

10. The non-transitory computer readable storage medium of claim 8, wherein the relationship is that the text string is a first limit related the first property.

11. The non-transitory computer readable storage medium of claim 10, wherein the graphical representation is dynamically updated to constrain the range of values belonging to the first property that are represented by the graphical representation when the third input modifies the control variable to a second limit for the first property.

12. The non-transitory computer readable storage medium of claim 8, wherein the relationship is that the text string is a first property name associated with the first property.

13. The non-transitory computer readable storage medium of claim 12, wherein the graphical representation is dynamically updated to represent a second property of the data in the table when the third input modifies the control variable to a second property name associated with the second property.

14. The non-transitory computer readable storage medium of claim 8, wherein the infographic document is a JSON document.

15. A computer implemented system, comprising:
  a processor; and
  a memory having stored thereon instructions, which when executed by the processor, cause the processor to perform steps comprising:
    providing a graphical user interface of an infographic template that includes a first area presenting a text object and a second area presenting a graphical representation of a first property of data stored in a table contained in an infographic document that is used to generate the graphical representation;
    receiving, via the graphical user interface, a first input representative of a text string in the text object, and storing the first input in a text portion of the infographic document;
    receiving, via the graphical user interface, a second input representative of associating the text string in the text object and the graphical representation;
    determining a relationship between the text string in the text object and the graphical representation by matching the text string to an entry in the table, and storing the relationship in a linking metadata portion of the infographic document; and
    linking the text string in the text object as a control variable to the graphical representation by storing data in the linking metadata portion of the infographic document that describes the link between the text string to the graphical representation, wherein the graphical representation is dynamically updated when a third input is received that modifies the control variable.

16. The computer implemented system of claim 15, wherein the instructions, which when executed by the processor, further cause the processor to perform steps comprising:
  generating an infographic artifact from the infographic document, the infographic artifact being configured to be rendered by a client device as a presentation that includes the control variable and the graphical representation; and
  transmitting the infographic artifact to the client device as an HTML page, wherein the graphical representation is dynamically updated when the client device adjusts the control variable.

17. The computer implemented system of claim 15, wherein the relationship is that the text string is a first limit related the first property.

18. The computer implemented system of claim 17, wherein the graphical representation is dynamically updated to constrain the range of values belonging to the first property that are represented by the graphical representation when the third input modifies the control variable to a second limit for the first property.

19. The computer implemented system of claim 15, wherein the relationship is that the text string is a first property name associated with the first property.

20. The computer implemented system of claim 19, wherein the graphical representation is dynamically updated to represent a second property of the data in the table when the third input modifies the control variable to a second property name associated with the second property.

* * * * *